(12) United States Patent
Lanham et al.

(10) Patent No.: US 12,333,596 B2
(45) Date of Patent: Jun. 17, 2025

(54) REAL-TIME DISTRIBUTED MICROSERVICE APPLICATION SYSTEM FOR SUPPORTING A DYNAMIC AUCTION SYSTEM

(71) Applicant: Bidwizer, Incorporated, Charlotte, NC (US)

(72) Inventors: Anthony Lanham, Waxhaw, NC (US); Devin Newstead, Darlington, MD (US); Julia Miles, Cornelius, NC (US)

(73) Assignee: Bidwizer Technology Group, LLC, Charlotte, NC (US)

( * ) Notice: Subject to any disclaimer, the term of this patent is extended or adjusted under 35 U.S.C. 154(b) by 17 days.

(21) Appl. No.: 18/166,646

(22) Filed: Feb. 9, 2023

(65) Prior Publication Data

US 2024/0046345 A1 Feb. 8, 2024

Related U.S. Application Data

(60) Provisional application No. 63/370,561, filed on Aug. 5, 2022.

(51) Int. Cl.
  *G06Q 30/00* (2023.01)
  *G06Q 20/38* (2012.01)
  *G06Q 30/08* (2012.01)

(52) U.S. Cl.
  CPC .......... *G06Q 30/08* (2013.01); *G06Q 20/389* (2013.01)

(58) Field of Classification Search
  CPC ..... G06Q 30/08; G06Q 30/0275; G06Q 30/06
  See application file for complete search history.

(56) References Cited

U.S. PATENT DOCUMENTS

| | | | | |
|---|---|---|---|---|
| 6,415,270 | B1 * | 7/2002 | Rackson | G06Q 40/10 705/36 R |
| 6,598,026 | B1 * | 7/2003 | Ojha | G06Q 50/188 705/26.8 |
| 8,117,090 | B2 | 2/2012 | Romero | |
| 8,315,921 | B2 * | 11/2012 | Hallowell | G06Q 30/0601 705/14.62 |
| 8,438,072 | B2 * | 5/2013 | Fusz | G06Q 30/0601 705/26.1 |

(Continued)

FOREIGN PATENT DOCUMENTS

WO  WO 2014/197812 A1  12/2014

OTHER PUBLICATIONS

"Optimal Bidding in Online Auctions," by Dimitris Bertsimas, Jeffrey Hawkins, Georgia Perakis, Journal of Revenue and Pricing Management, 8.1: 21-41, Jan. 2009 (Year: 2009).*

*Primary Examiner* — Anne M Georgalas
(74) *Attorney, Agent, or Firm* — Finnegan, Henderson, Farabow, Garrett & Dunner, LLP

(57) ABSTRACT

Disclosed embodiments relate to a real-time distributed microservices application system for supporting an auction system. The system may perform operations including obtaining a bid and dealer vehicle information from a first entity; obtaining buyer vehicle information from a second entity; creating a dynamic and real-time auction for the second entity based on the buyer vehicle information; transmitting a message to the second entity to join the auction; transmitting a message to the first entity to join the auction; and connecting the first and second entity in a server environment to implement the dynamic and real-time auction.

21 Claims, 15 Drawing Sheets

(56) References Cited

U.S. PATENT DOCUMENTS

| | | | | |
|---|---|---|---|---|
| 8,595,082 B2* | 11/2013 | Skutta | ............... | G06Q 30/08 |
| | | | | 705/26.1 |
| 10,380,680 B2* | 8/2019 | Friedman | ........... | G06Q 30/0643 |
| 11,127,059 B2* | 9/2021 | Zhukov | .............. | G06Q 30/0639 |
| 2002/0082978 A1* | 6/2002 | Ghouri | ................ | G06Q 30/08 |
| | | | | 705/37 |
| 2003/0093355 A1* | 5/2003 | Issa | ................ | G06Q 40/04 |
| | | | | 705/37 |
| 2005/0010484 A1* | 1/2005 | Bohannon | ......... | G06Q 30/0641 |
| | | | | 705/26.7 |
| 2005/0065853 A1* | 3/2005 | Ferreira | ............ | G06Q 30/0611 |
| | | | | 705/26.4 |
| 2005/0216364 A1* | 9/2005 | Jurisic | ............... | G06Q 30/0641 |
| | | | | 705/27.1 |
| 2008/0071692 A1* | 3/2008 | Jain | ................. | G06Q 50/188 |
| | | | | 705/37 |
| 2008/0195520 A1* | 8/2008 | Rabenold | ............... | G06Q 40/04 |
| | | | | 705/37 |
| 2010/0325017 A1 | 12/2010 | Mirzakhanyan | | |
| 2012/0084168 A1* | 4/2012 | Adair | ................ | G06Q 30/08 |
| | | | | 705/26.3 |
| 2013/0254085 A1* | 9/2013 | Tanimoto | ............ | G06Q 40/04 |
| | | | | 705/37 |
| 2018/0322565 A1* | 11/2018 | Joyner | ................ | G06Q 30/08 |
| 2023/0030309 A1* | 2/2023 | Christeas | ............... | G06Q 30/08 |

\* cited by examiner

REAL-TIME DISTRIBUTED MICROSERVICE APPLICATION SYSTEM FOR SUPPORTING A DYNAMIC AUCTION SYSTEM

CROSS REFERENCE TO RELATED APPLICATION

This application claims the benefit of priority of U.S. Provisional Application No. 63/370,561, filed Aug. 5, 2022. The foregoing application is incorporated herein by reference in its entirety.

BACKGROUND

Technical Field

The present disclosure relates generally to the applications and services for technically supporting an auction. More specifically, the present disclosure relates to systems, methods, and devices for technically facilitating an auction between buyers and sellers. The techniques disclosed herein may be used for a number of different products and services, including, for example, cars, boats, hotels, airline tickets, medical equipment, real estate, intangible property, etc., as well as various other types of products or services.

Background Information

The disclosed methods and systems are directed to providing new and unconventional techniques of creating, performing, and updating dynamic and real-time auctions. In the car sales industry, for example, common approaches for selling vehicles may include receiving one, low price for a vehicle from a dealership or other car-buying entity. This process can be time consuming without providing competitive pricing on the sale of the vehicle. This can lead to a vehicle owner spending a large amount of time trying to sell a vehicle and receiving only one offer that may be lower than the actual value of the vehicle. Alternatively, a vehicle owner may try to sell a vehicle to an individual rather than a dealership. However, this process can present difficulties in communicating quality pictures and other information about the vehicle to potential buyers. Additionally, strangers may call and visit the vehicle owner to view the vehicle, and this may lead to time consuming and inconvenient meetings. Attempting to sell the vehicle to an individual has no guarantee that the vehicle will sell and requires a time intensive process. Such approaches to selling vehicles may also be applicable in other sales industries, including, but not limited to, vehicle parts, medical equipment, boats, insurance, bank rates, and others. These current processes are time-consuming, stressful, and incur unnecessary costs.

Alternative and technology-based approaches to buying and selling vehicles are needed. Such technical solutions should reduce the time, stress, and costs necessary to sell a vehicle. Such technical solutions should remove barriers to buying and selling vehicles by providing a process that allows multiple bidders to drive up a vehicle's sale price to ensure the vehicle owner receives the highest market value for the vehicle. Such technical solutions should allow consumers to control the pricing of the vehicle, rather than allowing a dealership to dictate one, low price for the vehicle. Additionally, technical solutions should provide an easy-to-use process for vehicle owners to communicate vehicle information to potential buyers. Such technical solutions should also provide marketing that attracts potential buyers to the vehicle owner's sale and facilitates the sale of the vehicle without phone calls and visits from strangers. These technical solutions may be used across a variety of industries to facilitate the sale of a variety of products, services, or other items.

SUMMARY

The disclosed embodiments describe a real-time, distributed, microservice application system for supporting an auction system. For example, in an embodiment, the real-time distributed microservice application system may comprise a memory storing instructions and a processor configured to execute the instructions to perform operations for supporting an auction system. The operations may comprise obtaining a bid and dealer vehicle information from a first entity, obtaining buyer vehicle information from a second entity, creating a dynamic and real-time auction for the second entity based on the buyer vehicle information, transmitting a message to the second entity to join the auction, transmitting a message to the first entity to join the auction, and connecting the first and second entity in a server environment to implement the dynamic and real-time auction.

According to a disclosed embodiment, the dealer vehicle information may include at least one of: vehicle make, vehicle model, vehicle options, vehicle color, vehicle condition, vehicle history, vehicle odometer reading, or vehicle geographic location.

According to a disclosed embodiment, the buyer vehicle information may include at least one of: vehicle make, vehicle model, vehicle options, vehicle color, vehicle condition, vehicle history, vehicle odometer reading, or vehicle geographic location.

According to a disclosed embodiment, the message transmitted to the first entity may be automatically transmitted via an electronic communications protocol.

According to a disclosed embodiment, the electronic communications protocol may include a notification application.

According to a disclosed embodiment, the message may be transmitted via a graphical user interface accessible by the first entity.

According to a disclosed embodiment, the message transmitted to the second entity may be automatically transmitted via an electronic communications protocol.

According to a disclosed embodiment, the electronic communications protocol may include a notification application.

According to a disclosed embodiment, the message may be transmitted via a graphical user interface accessible by the second entity.

According to a disclosed embodiment, the server environment may be instantiated on a just-in-time basis for the dynamic and real-time auction.

According to a disclosed embodiment, connecting the first and second entity in a server environment may include permitting access to the first and second entity into the server environment.

According to a disclosed embodiment, the operations may further comprise allowing the first entity to update a bid once access is permitted to the first entity.

According to a disclosed embodiment, the operations may further comprise allowing the second entity to accept or decline the updated bid, wherein the dynamic and real-time auction continues until a final bid is accepted by the second entity.

According to another disclosed embodiment, there may be a computer-implemented method for operating a real-time distributed microservice application system for supporting an auction system. The method may comprise obtaining a bid and dealer vehicle information from a first entity, obtaining buyer vehicle information from a second entity, creating a dynamic and real-time auction for the second entity based on the buyer vehicle information, transmitting a message to the second entity to join the auction, transmitting a message to the first entity to join the auction, and connecting the first and second entity in a server environment to implement the dynamic and real-time auction.

According to a disclosed embodiment, creating the dynamic and real-time auction may include comparing the dealer vehicle information with the buyer vehicle information and forming the auction based on matches between the dealer vehicle information and the buyer vehicle information.

According to a disclosed embodiment, the second entity may set a parameter for comparing the dealer vehicle information with the buyer vehicle information.

According to a disclosed embodiment, the parameter may include at least one of: vehicle make, vehicle model, vehicle options, vehicle color, vehicle condition, vehicle history, vehicle odometer reading, or vehicle geographic location.

According to a disclosed embodiment, the first entity may change the parameter and the auction may be updated based on the changed parameter.

According to a disclosed embodiment, the operations may further comprise transmitting an accepted message to the first entity when the bid is accepted by the second entity.

According to a disclosed embodiment, the operations may further comprise transmitting a second message, wherein the second message summarizes a transaction between the first and second entity and transmitting the second message to the second entity when the dynamic and real-time auction ends.

According to another disclosed embodiment, a non-transitory computer readable medium may include instructions that, when executed by at least one processor, may cause the at least one processor to perform operations for implementing machine learning techniques to develop display options. The operations may comprise receiving inputs from an entity, wherein the inputs include at least one of vehicle make, vehicle model, or vehicle color, receiving personal data from the entity, feeding the received inputs and personal data into a machine learning model, wherein the machine model includes comparable inputs and personal data based on a plurality of historical dynamic and real-time auctions, performing a vehicle search based on an output of the machine learning model, and displaying a result of the vehicle search to the entity.

According to a disclosed embodiment, the machine learning model may be configured to fuzz search parameters based on the plurality of historical dynamic and real-time auctions.

According to a disclosed embodiment, the fuzzed search parameters may include a vehicle price.

According to a disclosed embodiment, the fuzzed search parameters may include a vehicle type.

According to a disclosed embodiment, the fuzzed search parameters may include a vehicle model.

According to a disclosed embodiment, the fuzzed search parameters may include a vehicle condition.

According to a disclosed embodiment, the fuzzed search parameters may include a vehicle year.

According to a disclosed embodiment, the fuzzed search parameters may include a vehicle color.

According to a disclosed embodiment, the fuzzed search parameters may include a geographic location.

According to a disclosed embodiment, the personal data may include a geographical location.

According to a disclosed embodiment, the entity may set a radius around a location to determine the geographical location.

According to a disclosed embodiment, the personal data may include a credit score.

According to a disclosed embodiment, the vehicle search may include vehicles above a certain price range when the credit score is above a predetermined limit.

According to a disclosed embodiment, the vehicle search may limit the result to only include vehicles below a certain price range when the credit score is below a predetermined limit.

According to a disclosed embodiment, the received inputs may be default parameters.

According to a disclosed embodiment, the entity may deselect the default parameters.

According to another disclosed embodiment, there may be a computer-implemented method for implementing machine learning techniques to develop display options. The method may comprise receiving inputs from an entity, wherein the inputs include at least one of vehicle make, vehicle model, or vehicle color, receiving personal data from the entity, feeding the received inputs and personal data into a machine learning model, wherein the machine model includes comparable inputs and personal data based on a plurality of historical dynamic and real-time auctions, performing a vehicle search based on an output of the machine learning model, and displaying a result of the vehicle search to the entity.

According to a disclosed embodiment, the operations may further comprise receiving an updated input from the entity, feeding the updated input into the machine learning model, performing an updated vehicle search based on an updated output of the machine learning model, and displaying an updated result of the vehicle search to the entity.

According to a disclosed embodiment, the operations may further comprise receiving updated personal data from the entity, feeding the updated personal data into the machine learning model, performing an updated vehicle search based on an updated output of the machine learning model, and displaying an updated result of the vehicle search to the entity.

According to a disclosed embodiment, the displayed result may include a display screen with a report of the top three vehicle search results.

According to another disclosed embodiment, a non-transitory computer readable medium may include instructions that, when executed by at least one processor, may cause the at least one processor to perform operations for guarding inventory. The operations may comprise identifying a selection of vehicles stored as a vehicle inventory, accessing the selection of vehicles for a plurality of dynamic and real-time auctions, selecting a first buyer of at least one auction of the plurality of dynamic and real-time auctions, wherein the first buyer selected at least one vehicle from the selection of vehicles, reserving the at least one vehicle from the selection of vehicles, selecting a second buyer of at least a different auction of the plurality of dynamic and real-time auctions, wherein the second buyer selected the at least one vehicle from the selection of vehicles, identifying a conflict between the first buyer and the second buyer, determining, based on the reservation, a winner, and selecting the first buyer to receive the at least one vehicle from the selection of vehicles.

According to a disclosed embodiment, the conflict may be identified before a termination of the auction involving the first buyer and the different auction involving the second buyer.

According to a disclosed embodiment, the conflict may be identified after a termination of one of the auctions involving the first buyer and the different auction involving the second buyer.

According to a disclosed embodiment, the winner may be determined based on a first to close of the auction involving the first buyer and the different auction involving the second buyer.

According to a disclosed embodiment, the first to close of the auction may be determined based on a first of the first buyer and the second buyer to complete a transaction.

According to a disclosed embodiment, reserving the at least one vehicle may include removing the at least one vehicle from the vehicle inventory.

According to a disclosed embodiment, the operations may further comprise generating a non-winning notification, based on the determination of the winner, in a non-winning one of the auction involving the first buyer and the different auction involving the second buyer.

According to a disclosed embodiment, the non-winning notification may be sent to a non-winning buyer of the first buyer and the second buyer.

According to a disclosed embodiment, the non-winning notification may be automatically transmitted via an electronic communications protocol.

According to a disclosed embodiment, the non-winning buyer may be returned to the different auction, wherein the different auction does not include the at least one vehicle.

According to a disclosed embodiment, the operations may further comprise generating a winning notification, based on the determination of the winner, in a winning one of the auction involving the first buyer and the different auction involving the second buyer.

According to a disclosed embodiment, the winning notification may be sent to a winning buyer of the first buyer and the second buyer.

According to a disclosed embodiment, the winning notification may be automatically transmitted via an electronic communications protocol.

According to another disclosed embodiment, there may be a computer-implemented method for guarding inventory. The method may comprise identifying a selection of vehicles stored as a vehicle inventory, accessing the selection of vehicles for a plurality of dynamic and real-time auctions, selecting a first buyer of at least one auction of the plurality of dynamic and real-time auctions, wherein the first buyer selected at least one vehicle from the selection of vehicles, reserving the at least one vehicle from the selection of vehicles, selecting a second buyer of at least a different auction of the plurality of dynamic and real-time auctions, wherein the second buyer selected the at least one vehicle from the selection of vehicles, identifying a conflict between the first buyer and the second buyer, determining, based on the reservation, a winner, and selecting the first buyer to receive the at least one vehicle from the selection of vehicles.

According to a disclosed embodiment, identifying the selection of vehicles may include obtaining first vehicle information from the first buyer to create the at least one auction and obtaining second vehicle information from the second buyer to create the at least a different auction, wherein the at least one auction and the at least a different auction both include the at least one vehicle.

According to a disclosed embodiment, the first vehicle information may include at least one of: vehicle make, vehicle model, vehicle options, vehicle color, vehicle condition, vehicle history, vehicle odometer reading, or vehicle geographic location.

According to a disclosed embodiment, the second vehicle information may include at least one of: vehicle make, vehicle model, vehicle options, vehicle color, vehicle condition, vehicle history, vehicle odometer reading, or vehicle geographic location.

According to a disclosed embodiment, the at least one vehicle may be sold by a dealer.

According to a disclosed embodiment, the operations may further comprise allowing the dealer to save a floor price, wherein the floor price is a minimum sales price of the at least one vehicle.

According to a disclosed embodiment, the floor price may be applied to every auction in the plurality of dynamic and real-time auctions.

According to a disclosed embodiment, the operations may further comprise allowing the dealer to adjust the floor price.

According to a disclosed embodiment, a non-transitory computer readable medium may include instructions that, when executed by at least one processor, may cause the at least one processor to perform operations for resetting a timer to efficiently implement a dynamic and real-time auction. The operations may comprise initializing a dynamic and real-time auction involving a plurality of participants, wherein the dynamic and real-time auction ends after a specified amount of time, starting the dynamic and real-time auction, wherein the dynamic and real-time auction includes a countdown timer set to the specified amount of time, obtaining bids from the plurality of participants in the dynamic and real-time auction, allowing the countdown timer to run to a zero time in the dynamic and real-time auction, and resetting the countdown timer to the specified amount of time in the dynamic and real-time auction, wherein the resetting occurs until no more bids are obtained and a seller selects a winning bid.

According to a disclosed embodiment, the resetting may occur while bids are still being obtained.

According to a disclosed embodiment, the operations may further comprise stopping the resetting based on an input and while bids are still being obtained.

According to a disclosed embodiment, the input may be a determination that a threshold price is reached.

According to a disclosed embodiment, the operations may further comprise selecting a winning bid from a plurality of bids obtained during the dynamic and real-time auction and prior to the stopping of the resetting.

According to a disclosed embodiment, the input may be a determination that a threshold time is reached.

According to a disclosed embodiment, the operations may further comprise the seller selecting a winning bid from a plurality of bids obtained during the dynamic and real-time auction and prior to the stopping of the resetting.

According to a disclosed embodiment, the input may be a determination that a threshold number of bids is reached.

According to a disclosed embodiment, the operations may further comprise the seller selecting a winning bid from a plurality of bids obtained during the dynamic and real-time auction and prior to the stopping of the resetting.

According to a disclosed embodiment, the operations may further comprise stopping the resetting based on a request to end the auction from the seller.

According to a disclosed embodiment, the request to end the auction may be based on the seller accepting the winning bid.

According to a disclosed embodiment, the operations may further comprise obtaining a floor price from the seller.

According to a disclosed embodiment, the floor price may be a minimum bid price accepted from the plurality of participants.

According to a disclosed embodiment, the operations may further comprise the seller adjusting a floor price during the dynamic and real-time auction.

According to a disclosed embodiment, the operations may further comprise saving the floor price across a plurality of dynamic and real-time auctions.

According to another disclosed embodiment, there may be a computer-implemented method for resetting a timer to efficiently implement a dynamic and real-time auction. The method may comprise initializing a dynamic and real-time auction involving a plurality of participants, wherein the dynamic and real-time auction ends after a specified amount of time, starting the dynamic and real-time auction, wherein the dynamic and real-time auction includes a countdown timer set to the specified amount of time, obtaining bids from the plurality of participants in the dynamic and real-time auction, allowing the countdown timer to run to a zero time in the dynamic and real-time auction, and resetting the countdown timer to the specific amount of time in the dynamic and real-time auction, wherein the resetting occurs until no more bids are obtained and a seller selects a winning bid.

According to a disclosed embodiment, the operations may further comprise transmitting a message to a winning participant of the plurality of participants wherein the winning participant is associated with the winning bid.

According to a disclosed embodiment, the message may be automatically transmitted via an electronic communications protocol.

According to a disclosed embodiment, the operations may further comprise transmitting a message to a non-winning participant of the plurality of participants wherein the non-winning participant is not associated with the winning bid.

According to a disclosed embodiment, the message may be automatically transmitted via an electronic communications protocol.

According to another disclosed embodiment, a non-transitory computer readable medium may include instructions that, when executed by at least one processor, may cause the at least one processor to perform operations adjusting a visual real-time price for live bidding in a dynamic auction. The operations may comprise implementing a dynamic auction based on an inventory of vehicles, displaying a current lowest bidder price on a graphical interface, wherein the current lowest bidder price relates to a lowest price metric among the inventory of vehicles, obtaining data inputs from one or more bidders in the dynamic auction while the dynamic auction is being implemented, and automatically adjusting, in real-time during the implementing of the dynamic auction, the current lowest bidder price on the graphical interface based on the obtained data inputs.

According to a disclosed embodiment, the operations may further comprise continually refreshing the current lowest bidder price on the graphical interface during the dynamic auction as the data inputs are obtained.

According to a disclosed embodiment, the operations may further comprise periodically refreshing the current lowest bidder price on the graphical interface during the dynamic auction as the data inputs are obtained.

According to a disclosed embodiment, the display of the current lowest bidder price may include a visual identification of a bidder corresponding to the current lowest bidder price.

According to a disclosed embodiment, the visual identification may include geographical information for a bidder corresponding to the current lowest bidder price.

According to a disclosed embodiment, the visual identification may include an avatar for a bidder corresponding to the current lowest bidder price.

According to a disclosed embodiment, the visual identification may include metric information for a bidder corresponding to the current lowest bidder price.

According to a disclosed embodiment, the display of the current lowest bidder price may include a monthly payment based on the current lowest bidder price.

According to a disclosed embodiment, the monthly payment may be automatically adjusted based on the adjusted current lowest bidder price.

According to a disclosed embodiment, the display of the current lowest bidder price may include a total number of bidders live bidding in the dynamic auction.

According to a disclosed embodiment, the data inputs may include at least one of: a location, a type of vehicle, a make of vehicle, or a number of days on market.

According to a disclosed embodiment, the graphical interface may include a cost savings metric, wherein the cost savings metric is calculated based on a starting bid and the current lowest bidder price.

According to a disclosed embodiment, the cost savings metric may be automatically adjusted based on the adjusted current lowest bidder price.

According to another disclosed embodiment, there may be a computer-implemented method for adjusting a visual real-time price for live bidding in a dynamic auction. The method may comprise implementing a dynamic auction based on an inventory of vehicles, displaying a current lowest bidder price on a graphical interface, wherein the lowest current bidder price relates to a lowest price metric among the inventory of vehicles, obtaining data inputs from one or more bidders in the dynamic auction while the dynamic auction is being implemented, and automatically adjusting, in real-time during the implementing of the dynamic auction, the current lowest bidder price on the graphical interface based on the obtained data inputs.

According to a disclosed embodiment, the operations may further comprise receiving vehicle inputs from a buyer, wherein the vehicle inputs relate to a vehicle type, retrieving vehicles from the inventory of vehicles that match the vehicle inputs, and creating the dynamic auction from the retrieved vehicles.

According to a disclosed embodiment, the vehicle inputs may relate to a vehicle make.

According to a disclosed embodiment, the operations may further comprise receiving updated vehicle inputs from a buyer, retrieving an updated list of vehicles from the inventory of vehicles that match the updated vehicle inputs, and updating the dynamic auction with the updated list of vehicles.

According to a disclosed embodiment, the operations may further comprise accepting the current lowest bidder price, wherein the current lowest bidder price is associated with a vehicle from the inventory of vehicles.

According to a disclosed embodiment, the operations may further comprise allowing a bidder to set a floor price, wherein the bidder is automatically removed from the dynamic auction when the current lowest bidder price goes below the floor price.

According to a disclosed embodiment, the operations may further comprise allowing the bidder to save the floor price across multiple dynamic auctions.

BRIEF DESCRIPTION OF THE DRAWINGS

The accompanying drawings, which are incorporated in and constitute a part of this specification, illustrate disclosed embodiments and, together with the description, explain the disclosed embodiments.

DETAILED DESCRIPTION

In the following detailed description, numerous specific details are set forth to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence or constrained to a particular system configuration. Additionally, some of the described embodiments or elements thereof can occur or be performed simultaneously, at the same point in time, or concurrently.

The techniques for supporting an auction system described herein overcome several technological problems relating to the time, cost, and lack of efficiency in buying and selling products, such as vehicles. In particular, the disclosed embodiments provide techniques for efficiently and securely connecting buyers and sellers in dynamic and real-time auctions. As discussed above, the process of buying and selling cars may involve receiving an inadequate offer for a vehicle and time-consuming meetings. Existing methods of buying and selling products, such as vehicles, fail to provide dynamic and real-time connections of buyers and sellers for the purchase and sale of an inventory of products or services, etc., such as vehicles or the like.

The disclosed embodiments provide solutions to these and other problems arising from current techniques. For example, various disclosed techniques create efficiencies over current techniques by creating a dynamic and real-time auction and connecting a first and second entity in a server environment to implement the dynamic and real-time auction. The disclosed techniques allow for a quicker, less expensive, more secure, and more efficient way to buy and sell products or services, such as vehicles or the like. The disclosed techniques also provide other solutions to improve a user experience when buying and selling products or services. For example, the disclosed techniques may use machine learning techniques to develop display options for users, may guard inventory in a user's dynamic and real-time auction, may reset a timer to efficiently implement a dynamic and real-time auction for a user, and may adjust a visual real-time price for live bidding in a dynamic auction. For these and other reasons that will be apparent to those skilled in the art, the disclosed techniques provide improved technological performance and efficiency over existing techniques.

References will now be made in detail to the disclosed embodiments, examples of which are illustrated in the accompanying drawings.

Figure 1:
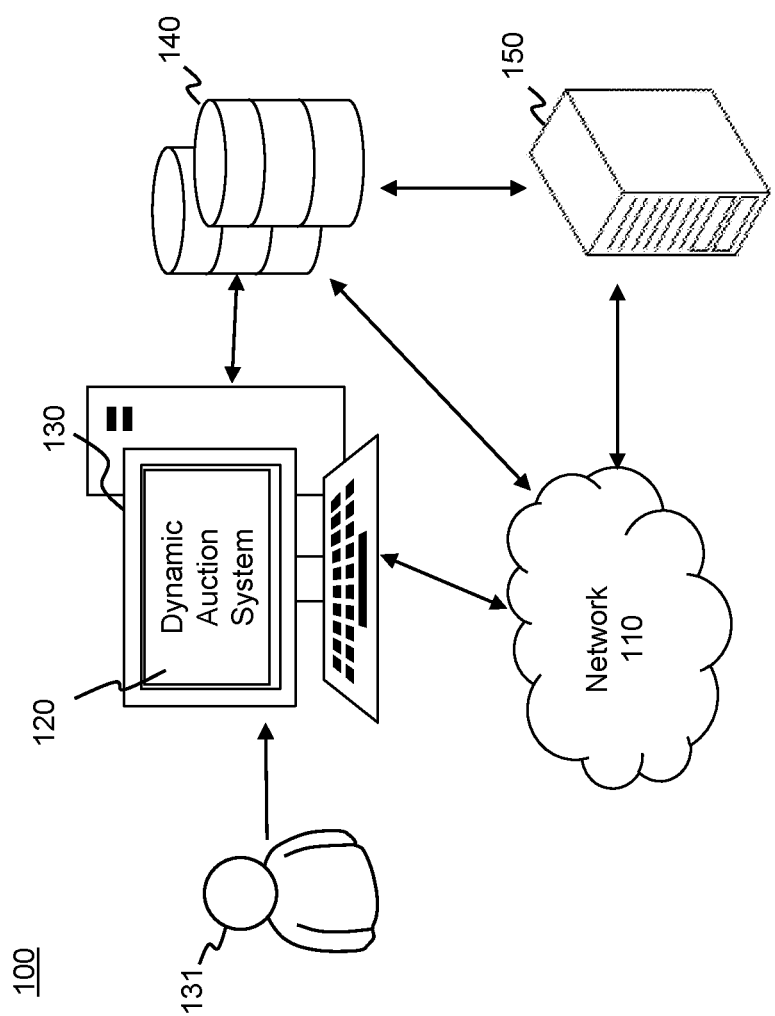
FIG. 1 is a block diagram of an exemplary system for implementing a dynamic and real-time auction, in accordance with disclosed embodiments.

FIG. 1 illustrates an exemplary system 100 for supporting an auction system, consistent with the disclosed embodiments. System 100 may represent an environment in which software code is developed and/or executed, for example in a cloud environment. System 100 may include one or more dynamic auction system 120, one or more computing devices 130, one or more databases 140, and one or more servers 150, as shown in FIG. 1.

The various components may communicate over a network 110. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, the communications may take place across two or more of these forms of networks and protocols. While system 100 is shown as a network-based environment, it is understood that the disclosed systems and methods may also be used in a localized system, with one or more of the components communicating directly with each other.

Computing devices 130 may be a variety of different types of computing devices capable of developing, storing, analyzing, and/or executing software code. For example, computing device 130 may be a personal computer (e.g., a desktop or laptop), an IoT device (e.g., sensor, smart home appliance, connected vehicle, etc.), a server, a mainframe, a vehicle-based or aircraft-based computer, a virtual machine (e.g., virtualized computer, container instance, etc.), or the like. Computing device 130 may be a handheld device (e.g., a mobile phone, a tablet, or a notebook), a wearable device (e.g., a smart watch, smart jewelry, an implantable device, a fitness tracker, smart clothing, a head-mounted display, etc.), an IoT device (e.g., smart home devices, industrial devices, etc.), or various other devices capable of processing and/or receiving data. Computing device 130 may operate using a Windows™ operating system, a terminal-based (e.g., Unix or Linux) operating system, a cloud-based operating system (e.g., through AWS™, Azure™, IBM Cloud™, etc.), or other types of non-terminal operating systems. As discussed further below, computing devices 130 may be used for developing and/or running software code, functions, or scripts. For example, a user 131 may develop software code through an Integrated Development Environment (IDE) operated on computing device 130.

System 100 may further comprise one or more database(s) 140, for storing and/or executing software. For example, database 140 may be configured to store data, software, or code, such as data input using computing device 130. Database 140 may further be accessed by computing device 130, server 150, or other components of system 100 for downloading, receiving, processing, editing, or running the stored software, code, or data. Database 140 may be any suitable combination of data storage devices, which may optionally include any type or combination of databases, load balancers, dummy servers, firewalls, back-up databases, and/or any other desired database components. In some embodiments, database 140 may be employed as a cloud service, such as a Software as a Service (SaaS) system, a Platform as a Service (PaaS), or Infrastructure as a Service (IaaS) system. For example, database 140 may be based on infrastructure or services of Amazon Web Services™ (AWS™), Microsoft Azure™, Google Cloud Platform™, Cisco Metapod™, Joyent™, vmWare™, or other cloud computing providers. Database 140 may also include file sharing services, such as Dropbox™, Google Docs™, or iCloud™. In some embodiments, database 140 may be a remote storage location, such as a network drive or server in communication with network 110. In other embodiments database 140 may also be a local storage device, such as local memory of one or more computing devices (e.g., computing device 130) in a distributed computing environment.

System 100 may also comprise one or more server device(s) 150 in communication with network 110. Server device 150 may manage the various components in system 100. In some embodiments, server device 150 may be configured to process and manage requests between computing devices 130 and/or databases 140. In embodiments where software code is developed within system 100, server device 150 may manage various stages of the development process, for example, by managing communications between computing devices 130 and databases 140 over network 110. Server device 150 may identify updates to code in database 140, may receive updates when new or revised code is entered in database 140, and may participate in supporting an auction system as discussed below in connection with FIGS. 4-8.

System 100 may also comprise one or more dynamic auction system 120 in communication with network 110. Dynamic auction system 120 may be any device, component, program, script, or the like, for implementing a dynamic and real-time auction within system 100, as described in more detail below. Dynamic auction system 120 may be configured to monitor other components within system 100, including computing device 130, database 140, and server 150. In some embodiments, dynamic auction system 120 may be implemented as a separate component within system 100, capable of analyzing software and computer codes or scripts within network 110. In other embodiments, dynamic auction system 120 may be a program or script and may be executed by another component of system 100 (e.g., integrated into computing device 130, database 140, or server 150). Dynamic auction system 120 may further comprise one or more components for performing various operations of the disclosed embodiments. For example, dynamic auction system 120 may be configured to obtain a bid and dealer information and buyer vehicle information from a first and a second entity and connect the first and the second entity in a server environment to implement a dynamic and real-time auction as discussed below.

FIG. 2 is a block diagram showing an exemplary computing device 130 including dynamic auction system 120 in accordance with disclosed embodiments. Computing device 130 may include a processor 205. Processor (or processors) 210 may include one or more data or software processing devices. For example, the processor 205 may take the form of, but is not limited to, a microprocessor, embedded processor, or the like, or may be integrated in a system on a chip (SoC). Furthermore, according to some embodiments, the processor 205 may be from the family of processors manufactured by Intel®, AMD®, Qualcomm®, Apple®, NVIDIA®, or the like. The processor 205 may also be based on the ARM architecture, a mobile processor, or a graphics processing unit, etc. In some embodiments, dynamic auction system 120 may be employed as a cloud service, such as a Software as a Service (SaaS) system, a Platform as a Service (PaaS), or Infrastructure as a Service (IaaS) system. For example, dynamic auction system 120 may be based on infrastructure of services of Amazon Web Services™ (AWS™) Microsoft Azure™, Google Cloud Platform™, Cisco Metapod™, Joyent™, vmWare™, or other cloud computing providers. The disclosed embodiments are not limited to any type of processor configured in the computing device 130.

Memory (or memories) 220 may include one or more storage devices configured to store instructions or data used by the processor 205 to perform functions related to the disclosed embodiments. Memory 210 may be configured to store software instructions, such as programs, that perform one or more operations when executed by the processor 205 to implement a dynamic and real-time auction, for example, using methods 400, 500, 600, 700 and 800, described in detail below. The disclosed embodiments are not limited to software programs or devices configured to perform dedicated tasks. For example, the memory 210 may store a single program, such as a user-level application, that performs the functions of the disclosed embodiments, or may comprise multiple software programs. Additionally, the processor 205 may in some embodiments execute one or more programs (or portions thereof) remotely located from the computing device 130. Furthermore, the memory 210 may include one or more storage devices configured to store data (e.g., machine learning data, training data, algorithms, etc.) for use by the programs, as discussed further below.

Computing device 130 may further include one or more input/output (I/O) devices 215. I/O devices 215 may include one or more network adaptors or communication devices and/or interfaces (e.g., WiFi, Bluetooth®, RFID, NFC, RF, infrared, Ethernet, etc.) to communicate with other machines and devices, such as with other components of system 100 through network 110. For example, dynamic auction system 120 may use a network adaptor to scan for code and code segments within system 100. In some embodiments, I/O devices 215 may also comprise a touchscreen configured to allow a user to interact with dynamic auction system 120 and/or an associated computing device. In various embodiments, I/O device 215 may comprise a keyboard, mouse, trackball, touch pad, stylus, and the like.

Figure 2A:
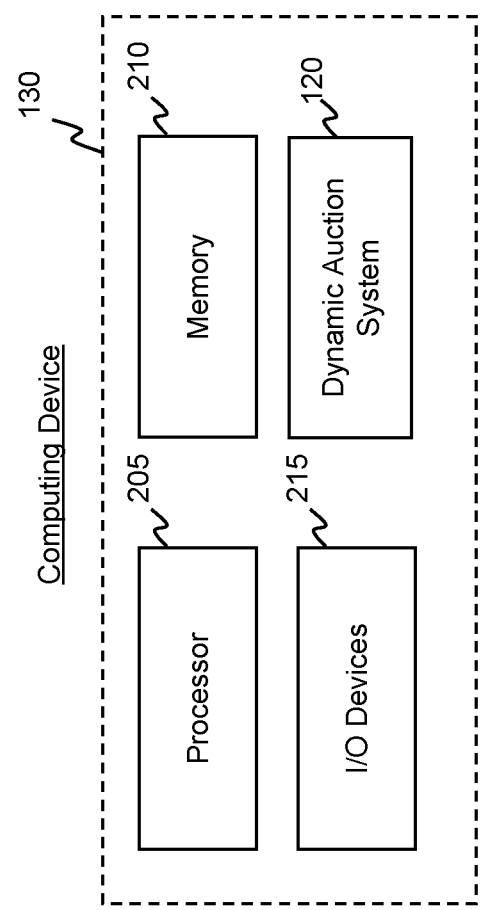
FIG. 2A is a block diagram showing an exemplary computing device, in accordance with disclosed embodiments.
Figure 2B:
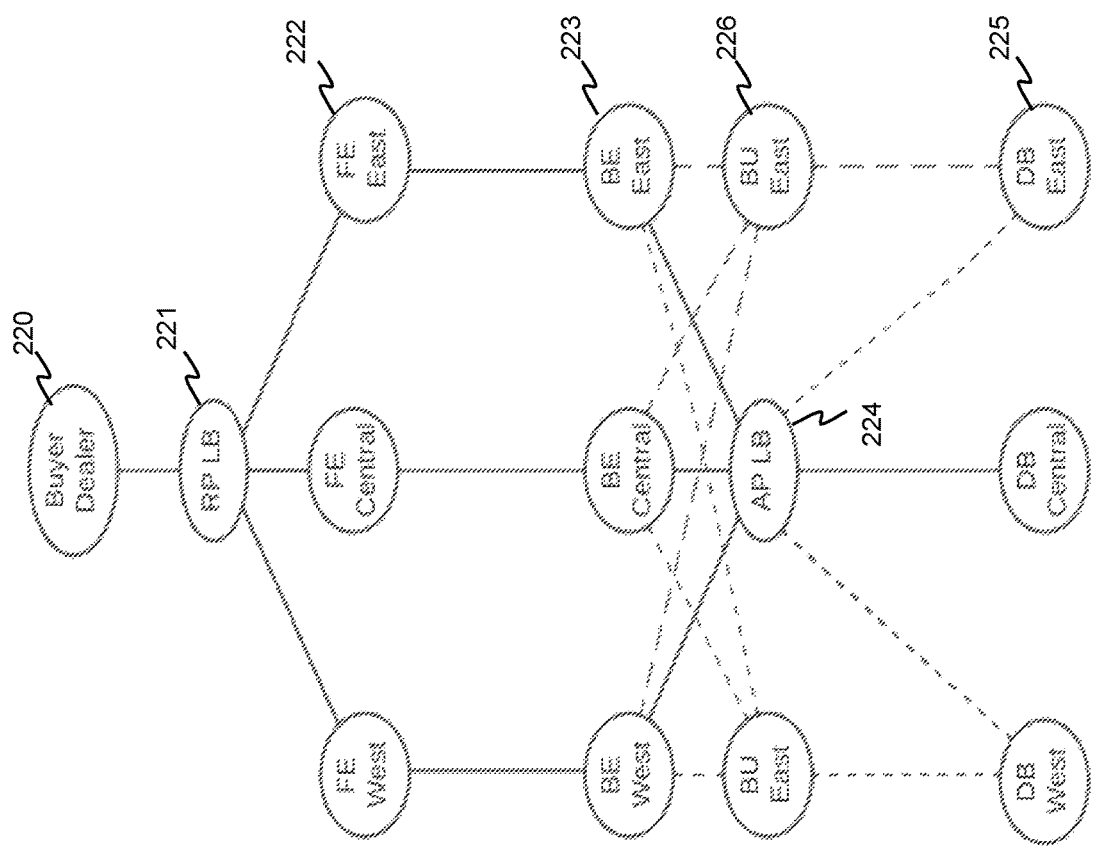
FIG. 2B is a block diagram showing an exemplary network architecture diagram, in accordance with disclosed embodiments.

FIG. 2B is a block diagram showing an exemplary dynamic auction system 120 architecture. For example, in accordance with this architecture buyer/dealer 220 may connect to regional proximity load balancer 221. Regional proximity load balancer 221 may distribute incoming traffic originating from multiple regions across multiple regions. Incoming traffic from a region may be routed to a regional proximity load balancer 221 that is geographically closest to the region from which the incoming traffic originated. Regional proximity load balancer 221 may use, for instance, geo-proximity load balancing to route the incoming traffic. Regional proximity load balancer 221 may route incoming traffic to a front end 222 which may include a front end 222 west, a front end 222 central, or a front end 222 east, etc., based on regional proximity. Front end 222 may include, for example, an ingress external IP, service external load balancer, angular, word press, and scale. Front end 222 may actively connect to back end 223. Back end 223 may include back end 223 west, back end 223 central, and back end 223 east, etc. Back end 223 may include an ingress internal IP, a service internal load balancer, dynamic auction system 120, and security platform. Back ends 223 may actively connect to active passive load balancer 224. Active passive load balancer 224 may recognize a failed node, for example, and redirect traffic to a next available node. Active passive load balancer 224 may actively connect backend 223 to database 225 central (e.g., database 140) and may passively monitor database 225 east and database 225 west. If database 225 central is active, active passive load balancer 224 may actively direct traffic from backend 223 to database 225 central. If active passive load balancer 224 detects that database 225 central has failed, active passive load balancer 224 may direct traffic from backend 223 to database 225 west or database 225 east. Backup 226 east may be passively connected to backend 223 east, backend 223 central, and backend 223 west. Backup 226 east may be a copy of data from database 225 that may be used to restore original data if a data loss event occurs. Backup 226 east maybe used to recover data if original data is lost or corrupted.

Figure 2C:
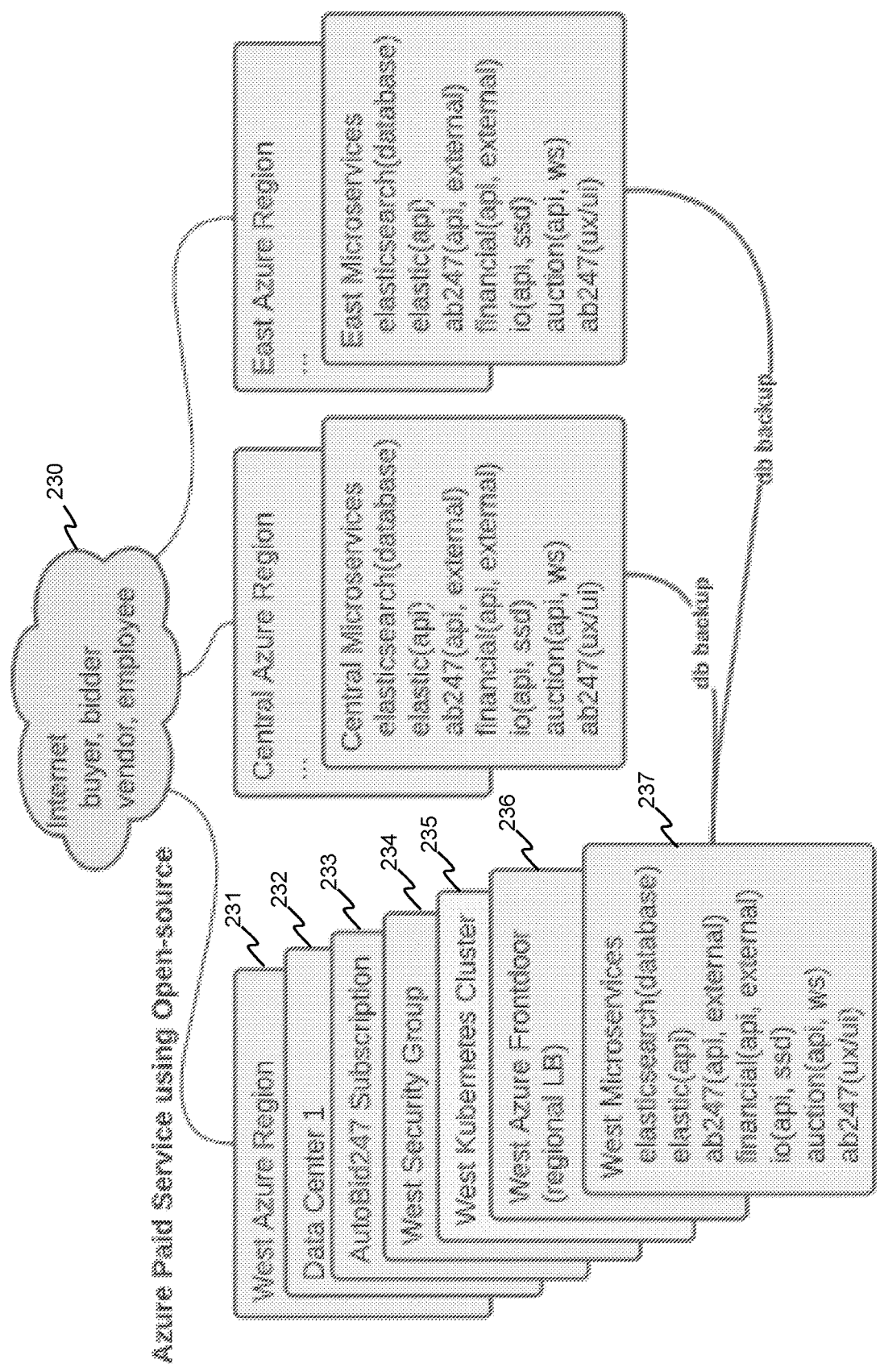
FIG. 2C is a block diagram showing an exemplary platform for implementing a dynamic auction, in accordance with disclosed embodiments.

FIG. 2C depicts a platform for implementing a dynamic and real-time auction. An entity 230 interacting with a dynamic and real-time auction, such as a buyer, a bidder, a vendor, or an employee, may connect to the dynamic and real-time auction system via an internet connection. Entity 230 may connect over the internet to, for example, an Azure™ region 231, such as west Azure™ region 231, central Azure™ region 231, or east Azure™ region 231.

West Azure™ region 231 may contain a data center 232. Data center 232 may manage, store, and share data and applications. Data center 232 may contain a subscription 233 to dynamic and real-time auction system. Subscription 233 may comprise a logical container to provision business and technical resources in the Azure™ region 231. Subscription 233 may authenticate and authorize a user to access resources within west Azure™ region 231. When connecting with the dynamic and real-time auction system, security group 234 may be used to provide a set of access control rules to inspect inbound and outbound traffic. Security group 234 may use properties including, but not limited to, source and destination IP, source and destination port, protocol, and priority to determine if inbound or outbound traffic should be allowed or denied. After obtaining access through security group 234, west Kubernetes cluster 235 may be accessed. West Kubernetes cluster 235 may be a set of nodes that run applications. West Kubernetes cluster 235 may allow containers to run across virtual, physical, and cloud environments. West Azure™ front door 236 may be a content delivery network for providing delivery of the dynamic and real-time auction system. West Azure™ front door 236 may be used as an entry point for the dynamic and real-time auction system by providing secure access between a user and the dynamic and real-time auction system content. West microservices 237 may then be accessed. West microservices 237 may comprise an application with independently deployed services. For example, West microservices 237 may contain a search and analytics engine, interaction with financial applications to facilitate transactions and payments, application programming interfaces for user experience and user interaction, and a web socket to facilitate a two-way interactive communication between a user and a server. West microservices 237 may be connected to central microservices 237 and east microservices 237 to provide database backup. Database backup may comprise redundant copies of the database from west microservices 237 in central microservices 237 and east microservices 237 that may be used to restore data in the case of a data loss event.

Figure 2D:
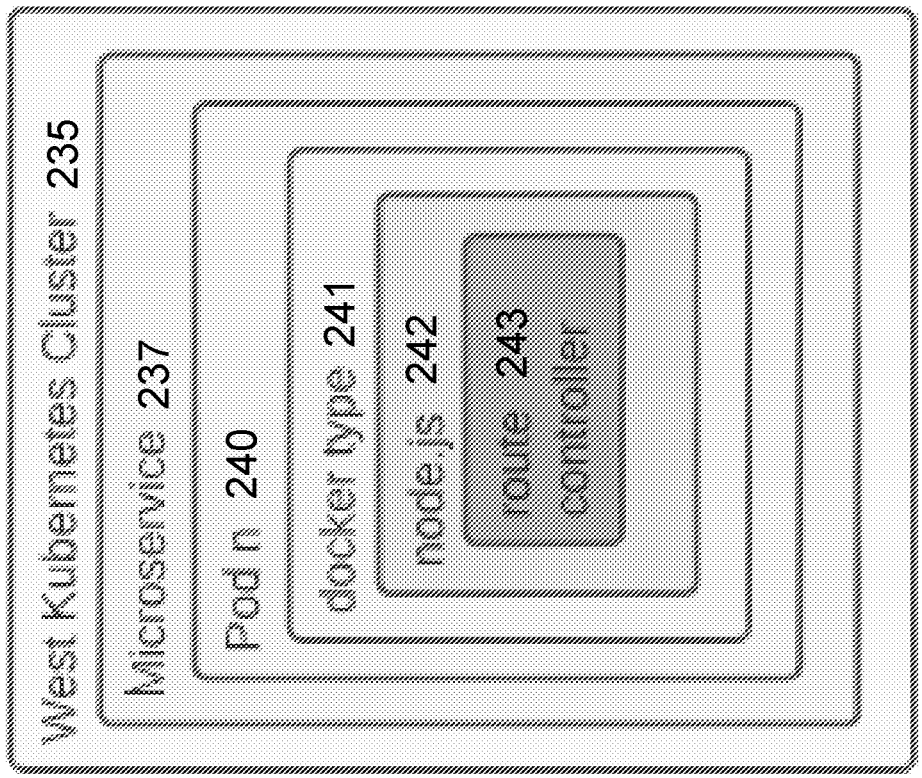
FIG. 2D is a block diagram showing an exemplary controller for implementing a dynamic auction, in accordance with disclosed embodiments.

FIG. 2D depicts an exemplary platform controller for implementing a dynamic and real-time auction system. Kubernetes cluster 235 may contain microservices 237, as disclosed above with respect to FIG. 2C. Microservices 237 may contain a pod 240. Pod 240 may represent a single instance of an application, such as a dynamic and real-time auction system in accordance with the embodiments herein. Pod 240 may be an ephemeral and disposable resource. Docker 241 may be a virtualized instance to create, share, and run individual containers within Kubernetes cluster 235. Docker 241 types may include an application programming interface docker, a docker for interactive communication sessions between a user and a server, user interface and user experience dockers, and database dockers. Node.js 242 may be a cross-platform runtime environment for developing server-side and networking applications. Node.js may use, for instance, an HTTPS module for making HTTPS requests. Node.js 242 may contain a route controller 243. Route controller 243 may match incoming requests for dispatch to an application's executable endpoints. Endpoints may be the units of the application for request-handling code. A router may choose which controller and which method on the controller may handle an incoming request. Route controller 243 may direct requests to a financial market scan, a record search, a vehicle identification, or an auction controller, etc.

Figure 2E:
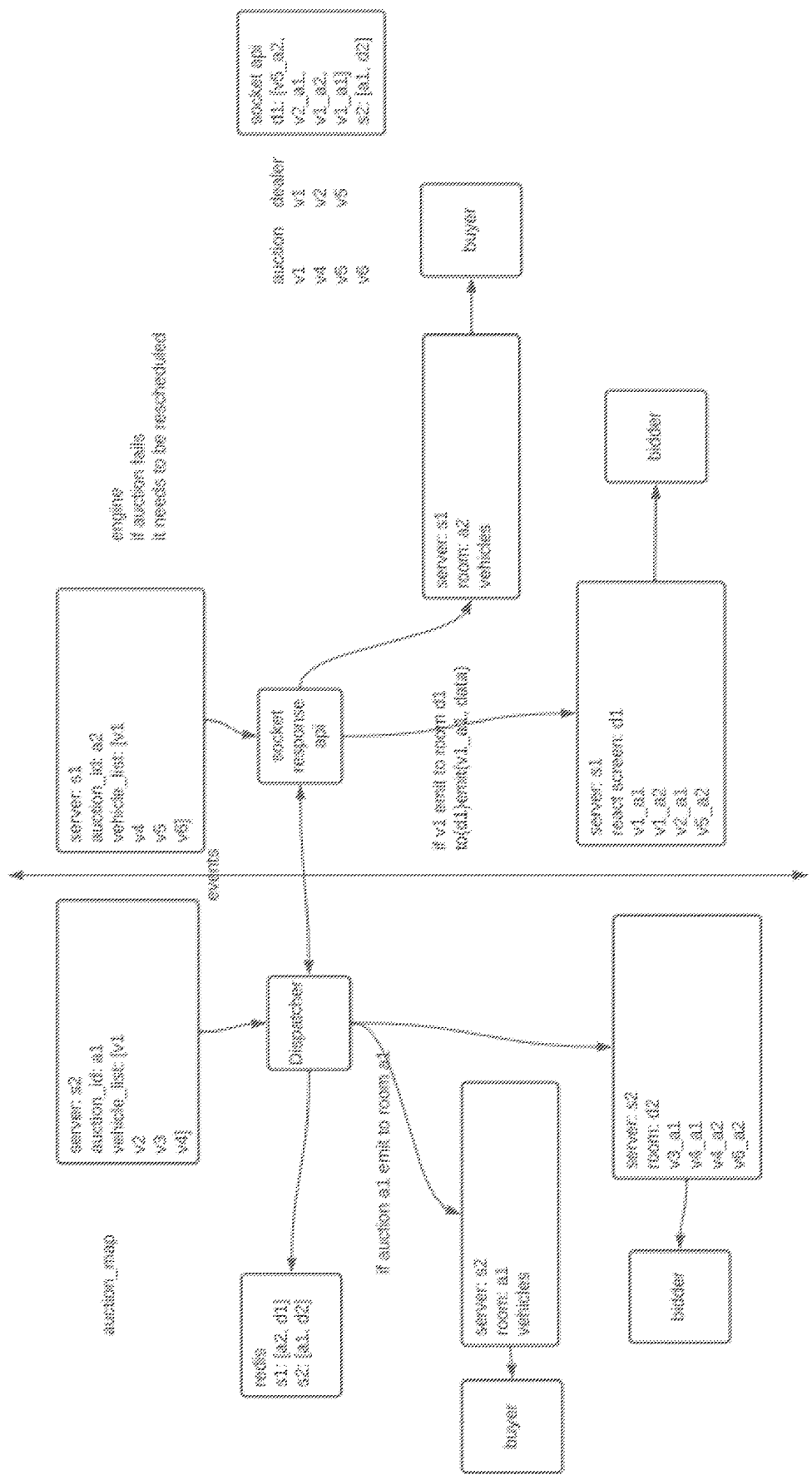
FIG. 2E is a block diagram showing an exemplary auction dispatch flow for implementing a dynamic auction, in accordance with disclosed embodiments.

FIG. 2E depicts an exemplary process for dispatching a dynamic and real-time auction system. Server s2 may deploy auction a1 for vehicles v1, v2, v3, and v4. Server s1 may deploy auction a2 for vehicles v1, v4, v5, and v6. Server s1 may connect to socket response API which may allow for communication functions between application programs. Socket response API may provide two-way communications with dispatcher. Server s2 may connect directly to dispatcher. Dispatcher may manage a set of associated services and route requests to these services while managing configuration at run time. Dispatcher may balance traffic among servers. Dispatcher may direct server s1 to implement auction a2 with dealer d1 and may direct server s2 to implement auction a1 with dealer d2. Dealer d1 may have vehicles v1, v2, and v5. Dealer d2 may have vehicles v3, v4, and v6. Dispatcher may emit auction a1 to room a1 on server s2. Server s2 may contain room a1 for connection with a buyer. Server s2 may also contain a room for dealer d2 with vehicles v3, v4, and v6 for connection with a bidder. Vehicle v4 may be used in auction a1 and auction a2. Dispatcher may emit auction a2 to room a2 on server s1. Server s1 may contain room a2 for connection with a buyer. Server s1 may also contain a room for dealer d1 with vehicles v1, v2, and v5. Vehicle v1 may be used in auction a1 and auction a2.

Figure 2F:
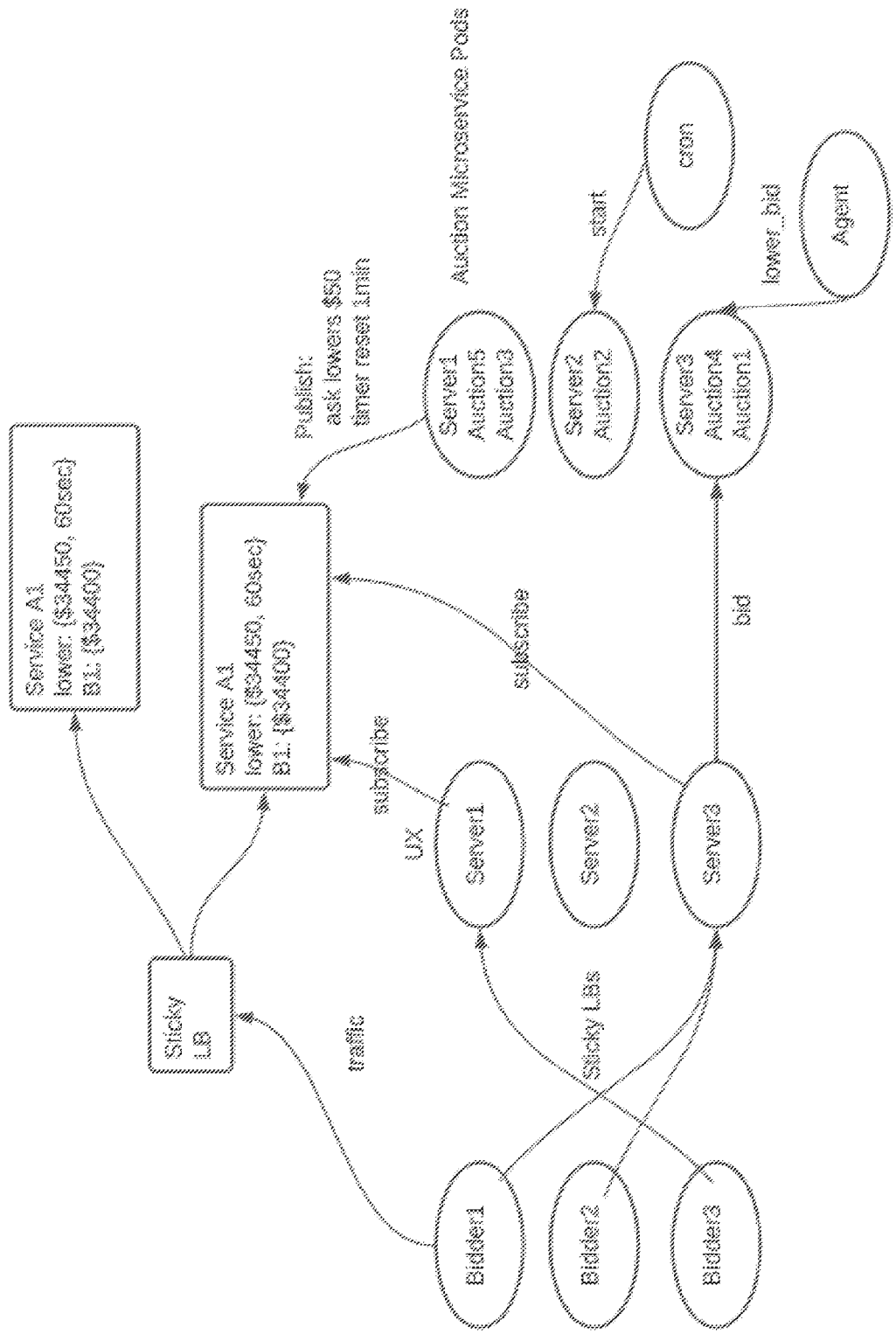
FIG. 2F is a block diagram showing an exemplary auction failover flow, in accordance with disclosed embodiments.

FIG. 2F depicts an exemplary auction failover system. An auction failover system may be implemented to provide a backup operational mode to direct traffic to a standby or redundant backup system when a primary auction system has failed. The dynamic and real-time auction system may use a sticky load balancer LB to assign an identifying attribute to bidders, such as bidder1, bidder2, and bidder3. Sticky load balancer LB may then use the tracking information to route all requests of each specific user to a specific server for the duration of a session. For example, as depicted in FIG. 2F, all of the requests from bidder1 and bidder2 for a particular session may be routed by sticky load balancer LB to server3. All requests from bidder2 for a particular session may be routed by sticky load balance LB to server1. Traffic from bidder1 may also be routed through a sticky load balancer to a failover redundant system. Failover redundant system may contain redundant data related to ServiceA1 to provide a redundant system in the event of a failover of primary ServiceA1. Server1 may also be implementing auction microservice pods, such as auctions and auction3. Server2 may also be implementing an auction microservice pod, such as Auction2. Server3 may also be implementing auction microservice pods, such as auction4 and auction1. Server1 and server3, which are in use by bidder1, bidder2, and bidder3 may subscribe to a service, such as ServiceA1. ServiceA1 may be an auction for a vehicle. Subscribing to a service may allow servers to send information to the service. Server1 may publish a request to ServiceA1 for a bid to be lowered by $50 with a timer being reset for one minute to receive an updated bid. Server3 may direct an incoming bid to auction4 or auction1, being implemented on server3.

Figure 2G:
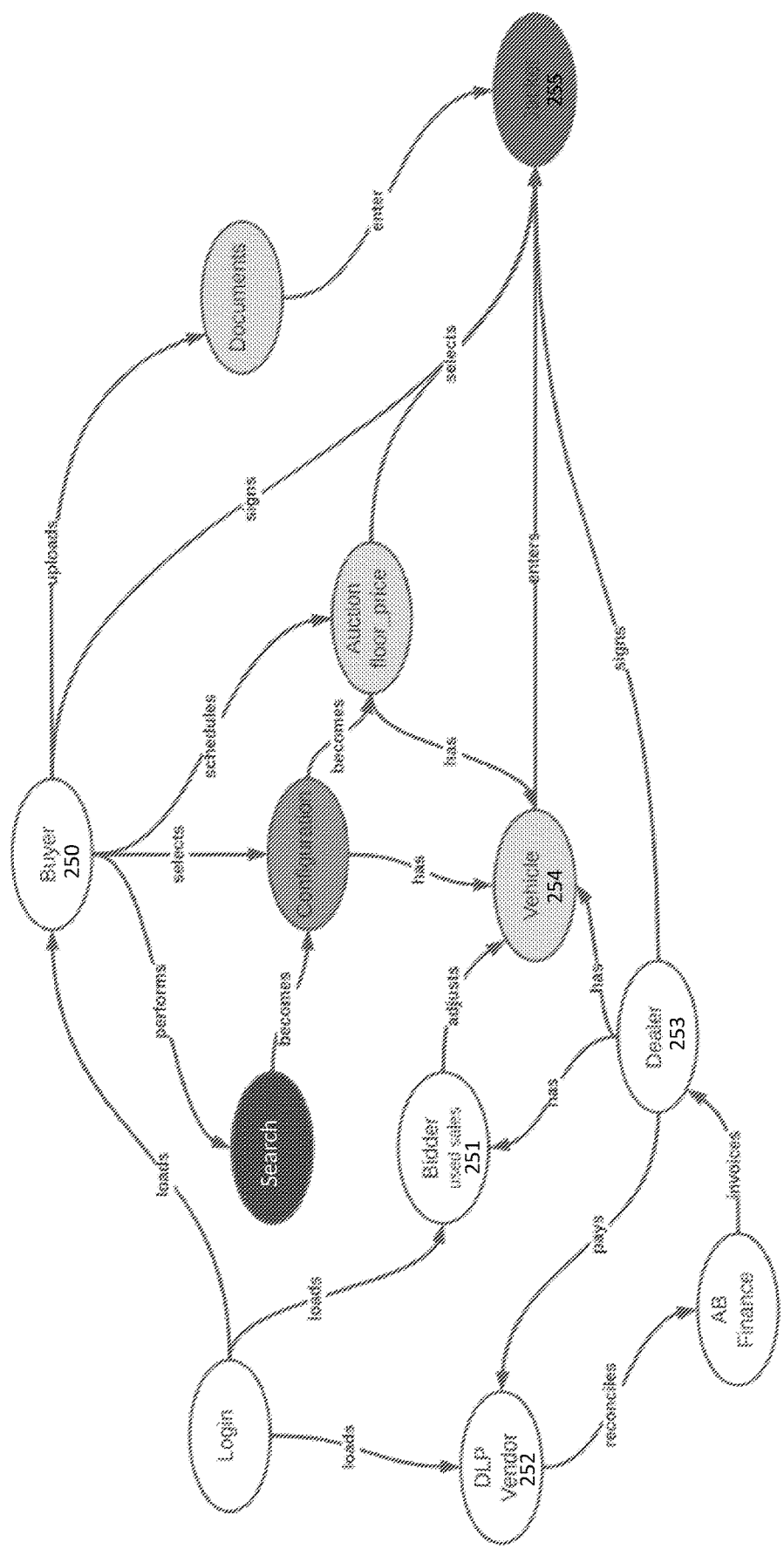
FIG. 2G depicts an exemplary data model interaction for a dynamic and real-time auction system, in accordance with disclosed embodiments.

FIG. 2G depicts an exemplary data model interaction for a dynamic and real-time auction system. As depicted in FIG. 2G, buyer 250, bidder 251, and DLP vendor 252 associated with dealer 253 may log in to the dynamic and real-time auction system. Buyer 251 may search for a vehicle 254, select a vehicle 254, and schedule a dynamic and real-time auction for the purchase of a vehicle 254. Dealer 253, through bidder 251, may adjust a sale price for vehicle 254 as part of the dynamic and real-time auction. When buyer 250 selects vehicle 254, vehicle 254 may enter jacket 255. Jacket 255 may be used to store all pertinent information related to the sale of vehicle 254. For example, jacket 255 may contain documents submitted by buyer 250 and information about vehicle 254. Throughout the dynamic and real-time auction additional information may be added to jacket 255, until jacket 255 contains all pertinent information needed for the sale of vehicle 254. When jacket 255 is complete, buyer 250 and dealer 253 may sign jacket 255 to complete the sale of vehicle 254.

Figure 2H:
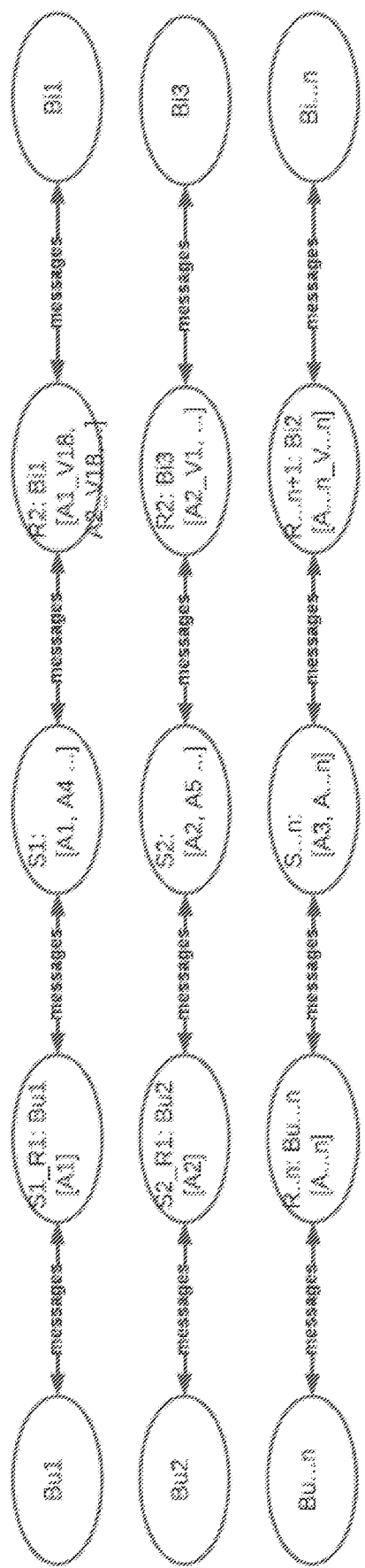
FIG. 2H depicts an exemplary real time aggregated and distributed communication system for implementing a dynamic and real-time auction, in accordance with disclosed embodiments.

FIG. 2H depicts an exemplary real-time aggregated and distributed communication system for implementing a dynamic and real-time auction. Each buyer, such as Buyer Bu1, Buyer Bu2, or Buyer Bu . . . n, may begin a dynamic and real-time auction for a vehicle selection process. Each bidder, such as Bidder Bi1, Bidder Bi3, or Bidder Bi . . . n, and each vehicle in the dynamic and real-time auctions may be related to a dealer. As depicted in FIG. 2H, each buyer, such as Buyer Bu1, Buyer Bu2, or Buyer Bu . . . n and each bidder, such as Bidder Bi1, Bidder Bi3, or Bidder Bi . . . n, may communicate with a server, such as Server S1, Server S2, or Server S . . . n in a room, such as Room R1, Room R2, or Room R . . . n. Server S1, Server S2, or Server S . . . n may host a plurality of dynamic and real-time auctions between a buyer and a bidder. Bidder Bi1, Bidder Bi3, or Bidder Bi . . . n may also have a list of auction and vehicle combinations. The list of auction and vehicle combinations may comprise a list of each vehicle of the bidder and the corresponding auctions that the vehicle is in. The list of auction and vehicle combinations may be specific to a bidder through a dealer relationship with the bidder. As shown in FIG. 2H, each auction may message the buyer participating in the auction and each auction and vehicle list specific to a bidder may message the bidder participating in the auction. In an exemplary embodiment, Buyer Bu1 may participate in Auction A1 through Server S1 in Room R1. Server S1 may host a plurality of dynamic and real-time auctions including Auction A1. Bidder Bi1 may be connected to Server S1 through Room R2. Auction and vehicle list A1_V18 may message Bidder Bi1 throughout the dynamic and real-time auction. Auction A1 may message Buyer Bu1 throughout the dynamic and real-time auction. By allowing each auction and vehicle list to actively message each bidder room, the bidder does not need to join each buyer auction room. Such configuration minimizes the amount of connections required to communicate between all connected buyers and bidders.

Aspects of the present disclosure may involve providing a real-time distributed microservice application system for supporting an auction system. A real-time distributed microservice application may be an application that is built with independent components that run each application process as a service. Each independent component of the real-time distributed microservice application may perform a single, or select group of, functions. The independent components of the real-time distributed microservice application may communicate and coordinate actions through message passing. The real-time distributed microservice application may support an auction system, as described below.

Figure 3:
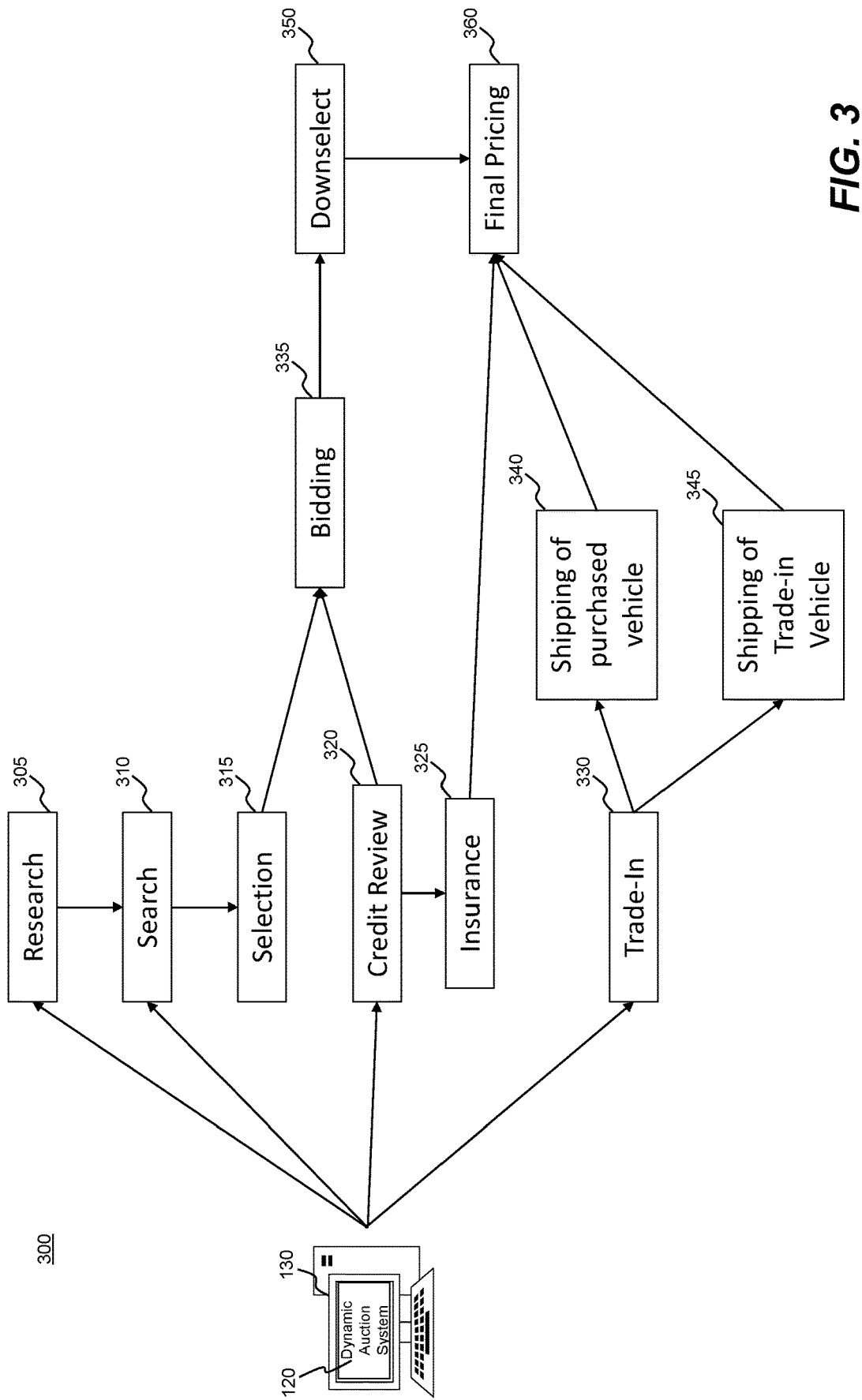
FIG. 3 is a block diagram showing an exemplary process for implementing a dynamic and real-time auction system, in accordance with disclosed embodiments.

FIG. 3 is a block diagram illustrating an exemplary process 300 for an auction system, consistent with disclosed embodiments. At step 305, user 131 of computing device 130 may research vehicles using dynamic auction system 120. Researching vehicles may comprise, for example, viewing stock exteriors and interior images of vehicles. Researching vehicles may also include viewing a vehicle image with a 360° spin, or with another immersive visualization. Further, the vehicle images that may be researched may show a variety of color variations of the vehicle. Research by user 131 using dynamic auction system 120 may include searching for specific vehicles based on factors such as vehicle make, vehicle model, vehicle options, vehicle year, vehicle condition, or other aspects of a vehicle. Dynamic auction system 120 may return to user 131 a selection of one or more vehicles that meet the research parameters. User 131 may then view stock images of the returned vehicles.

At step 310, user 131 may perform a search for vehicles using dynamic auction system 120. A search for vehicles using dynamic auction system 120 may comprise searching for specific vehicles that are for sale within dynamic auction system 120. A search by user 131 within dynamic auction system 120 may include searching for vehicles based on year, make, model, series, geographic location, etc., and other aspects of vehicles that are listed for sale within dynamic auction system 120. Dynamic auction system 120 may return to user 131 a selection of one or more vehicles that meet the search parameters. User 131 may sort and filter the returned vehicles based on further defining parameters, such as, for example, color, mileage, condition, or other aspects of vehicles. User 131 may view various details and images about the returned vehicles using dynamic auction system 120. At step 315, user 131 may select a vehicle from the returned search results for which user 131 want to begin a dynamic auction.

At step 320, user 131 may enter personal information into dynamic auction system 120 to allow dynamic auction system to determine a credit score or other evaluation of user 131. Dynamic auction system 120 may request personal information such as the name of user 131, the address of user 131, the social security number of user 131, the date of birth of user 131, and any other information from user 131 that is needed to determine a credit score of user 131. Dynamic auction system 120 may perform a soft pull credit check to determine a credit score of user 131. The soft pull credit check may return information on user 131 such as lines of credit, loans, payment history, collection accounts, and any other information that may be used to calculate a final price in the dynamic auction. At step 325, dynamic auction system 120 may use the information returned from the credit check of step 320 to determine estimated insurance amounts for user 131. The estimated insurance amounts may be used to calculate the final bid price in the dynamic auction.

At step 330, user 131 may enter information regarding a trade-in vehicle. If user 131 does not have a trade-in vehicle, this step may be skipped. If user 131 has a trade-in vehicle, dynamic auction system 120 may prompt user to enter information about the trade-in vehicle. For example, the user may enter information such as the trade-in vehicle make, model, year, VIN number, geographic location, and other identifying information that may be used to identify the trade-in vehicle in dynamic auction system 120. At step 340, dynamic auction system 120 may estimate a shipping cost of the purchased vehicle. The estimated shipping cost may be based on the geographic location of user 131 and the geographic location of the purchased vehicle. At step 345, dynamic auction system 120 may estimate a shipping cost of the trade-in vehicle. The estimated shipping cost may be based on a geographic location of the trade-in vehicle and the geographic location of the trade-in location. Dynamic auction system may use the shipping cost of the purchased vehicle as determined in step 340 and the shipping cost of the trade-in vehicle as determined in step 345 in calculating the final price.

At step 335, bidding for the selected vehicle may begin. A dealer system may bid automatically in dynamic auction system 131 based on data defined in the auction record. For example, dealer system may define a minimum amount that may be bid in an auction for a particular vehicle. The auction of step 335 may continue for a predefined period of time, or until user 131 selects a winning bidder. A dealer may change their bid within dynamic auction system 120 before or during the auction period.

At step 350, dynamic auction system 120 may select up to three potential winners of the auction at the end of a predefined period of time. The three potential winners of the bid may be automatically selected by having the lowest bid offers at the end of the predefined period of time. Dynamic auction system 120 may display the three winners to user 131.

At step 360, the three potential winners may display the final pricing of their vehicle. The final pricing may include additions and deductions to the price based on factors such as credit score, insurance, trade-in value, shipping costs, financing options, or any other factors that may affect the final price of the vehicle. The user may then select which vehicle to purchase from the three potential winners based on the final pricing provided by each of the three potential winners. User 131 may then sign a purchase order generated by dynamic auction system 120. The signed purchase order may then by transmitted by dynamic auction system 120 to the dealer to sign.

Figure 4:
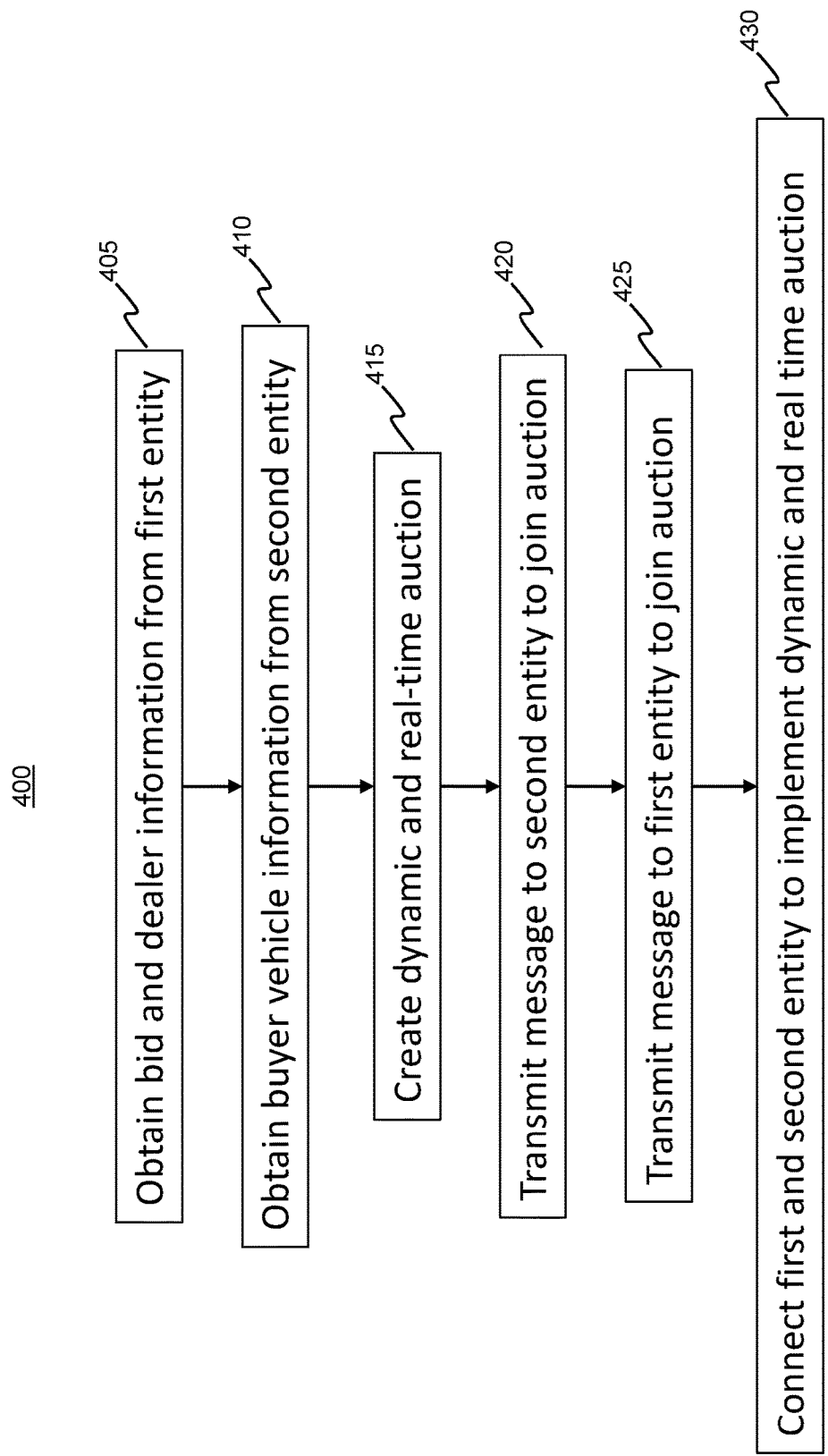
FIG. 4 is a flowchart showing an exemplary process for supporting a dynamic and real-time auction system, in accordance with disclosed embodiments.

FIG. 4 is a block diagram depicting an exemplary process 400 for providing a real-time distributed microservice application for supporting an auction system. At step 405, process 400 may include obtaining a bid and dealer vehicle information from a first entity. The first entity may be a vehicle dealership, an online vehicle retailer, an individual seller, or any other entity that sells vehicles. Dealer vehicle information may include at least one of a vehicle make, vehicle model, vehicle options, vehicle color, vehicle condition, vehicle history, vehicle odometer reading, or vehicle geographic location. Vehicle make may refer to a brand of the vehicle and vehicle model may refer to the specific type of vehicle made by the vehicle brand. Vehicle options may include dealer add-ons, such as paint protection, tire inflation, rustproofing, or other options that may be offered by a dealer. Vehicle condition may include information regarding the physical and aesthetic appearance and functionality of the vehicle. Vehicle history may include information such as maintenance records, accident reports, ownership records, and any other information related to the prior ownership and use of the vehicle. Vehicle odometer information may include information related to how many miles the vehicle has been driven. Bid information may be a price that the first entity will sell the vehicle for.

At step 410, process 400 may include obtaining buyer vehicle information from a second entity. The second entity may be any individual or entity that is buying a vehicle. Buyer vehicle information may comprise vehicle make, vehicle model, vehicle options, vehicle color, vehicle condition, vehicle history, vehicle odometer reading, or vehicle geographic location, etc. Obtaining buyer vehicle information may comprise receiving an input from a buyer that may include at least one of vehicle make, vehicle model, vehicle options, vehicle color, vehicle condition, vehicle history, vehicle odometer reading, or vehicle geographic location. A buyer may input information related to all categories of the buyer vehicle information, or a buyer may input fewer than all the categories of buyer vehicle information. Buyer vehicle information may correspond, for example, to a type of vehicle that the buyer may want to purchase.

At step 415, process 400 may include creating a dynamic and real-time auction for the second entity based on the buyer vehicle information. An auction may comprise a sales event wherein the first entity may place competitive bids to the second entity for the sale of a vehicle. The auction may take place in real-time with the first entity placing bids and the second entity receiving bids immediately in real-time (e.g., over network 110). The auction may be dynamic by allowing the first entity to update its bids throughout the auction process and allowing the second entity to evaluate the bids throughout the auction process. The dynamic and real-time auction may be created by comparing the dealer vehicle information with the buyer vehicle information and forming the auction based on matches between the dealer vehicle information and the buyer vehicle information. Comparing the dealer vehicle information with the buyer vehicle information may comprise determining if one or more parameters of the dealer vehicle information is the same as or similar to (e.g., within a threshold score of) one or more parameters of the buyer vehicle information. For example, comparing the dealer vehicle information with the buyer vehicle information may comprise comparing one or more of the vehicle make, vehicle model, vehicle options, vehicle color, vehicle condition, vehicle history, vehicle odometer reading, or vehicle geographic location from the buyer vehicle information and the dealer vehicle information to determine if one or more of these parameters are the same or similar. If it is determined that one or more of the parameters of the buyer vehicle information and the dealer vehicle information match, then a dynamic and real-time auction may be formed.

In some embodiments, the second entity may set a parameter for comparing the dealer vehicle information with the buyer vehicle information. Setting a parameter may comprise indicating that one or more of the parameters of the buyer vehicle information must match the dealer vehicle information. In a nonlimiting example, the second entity may set a specific vehicle make and a specific vehicle model as parameters that must be matched by the dealer vehicle information. If the dealer vehicle information does not meet the set parameter, then an auction will not be formed. In some embodiments, the second entity may change the parameter and the auction may be updated based on the changed parameter. Changing the parameter may comprise updating which of the parameters is set to be matched by the dealer vehicle information or changing the parameter that has already been set to a new parameter. The dynamic and real-time auction may be updated to include vehicles that match the changed parameter.

At steps 420 and 425, process 400 may include transmitting a message to the second entity to join the auction and transmitting a message to the first entity to join the auction. The messages to the second entity and the first entity may comprise a notification that the dynamic and real-time auction has been created, is ready to begin, or any other message that may notify the second entity and the first entity to join the auction. In some embodiments, the message to the first entity and the second entity may be automatically transmitted via an electronic communications protocol. An electronic communications protocol may comprise a set of rules that allows two or more entities in a communications system to transmit information. For example, the electronic communications protocol may define rules, semantics, syntax, and synchronization to allow two or more entities to transmit information. In some embodiments, the electronic communications protocol may include a notification application. A notification application may be a message or alert sent by an application to a user. For example, a notification application may comprise a text message, an email, a push notification, an in-application notification, or any other notification application that may transmit a message to the first entity and the second entity. In some embodiments, the message may be transmitted to the first entity and the second entity via a graphical user interface. A graphical user interface may comprise a visual method of interacting with a computer using windows, icons, menus, and other interaction methods. The first entity and the second entity may interact with the graphical user interface through I/O device 215 of computing device 130. The graphical user interface may include a website facilitating the dynamic and real-time auction, an application facilitating the dynamic and real-time auction, or any other interface accessible to the first entity and the second entity. A message may be transmitted to the first entity and the second entity by, for example, visually displaying the message on the graphical user interface.

At step 430, process 400 may include connecting the first entity and the second entity in or via a server-based environment to implement the dynamic and real-time auction. A server-based environment may be a networking environment that one or more customers may simultaneously access, either directly or remotely. A server may be a hardware server, or a server located in a hosted environment or a cloud environment (e.g., AWS™, Azure™, Docker™, etc.). A server environment may run applications that may be accessed by clients in a client/server architecture. In some embodiments, the server environment may be instantiated on a just-in-time basis for the dynamic and real-time auction. Instantiating the server environment on a just-in-time basis may comprise creating the server environment on a temporary basis for a fixed duration of time. For example, the server environment may be created in real-time and initiated after it is determined that there is a match between the buyer vehicle information and the dealer vehicle information. The just-in-time server environment may allow elevated and granular privileges to the first entity and the second entity to connect to the server environment in order to perform specific tasks, such as participating in the dynamic and real-time auction.

Connecting the first entity and the second entity in a server environment may comprise permitting access to the first entity and the second entity into the server environment. Access into the server environment for the first entity and the second entity may be permitted after login information is received. For example, the first entity and the second entity may be prompted to enter login information such as a username, password, credential, certificate, token, or any other information that may identify the first entity and the second entity for entry to the server environment. Access to the server environment may permitted after a single-factor authentication, in which the first entity or the second entity may be required to provide one form of identity verification, or a multi-factor authentication, in which the first entity or the second entity may be required to provide two or more forms of identity verification. If the first entity and the second entity each provide the required identifying information, the first entity and the second entity may be permitted to access the server environment and participate in the dynamic and real-time auction.

In some embodiments, process 400 may further include allowing the first entity to update a bid once access is permitted to the first entity. Updating a bid may comprise entering a new bid value that differs from the original bid value. For example, the first entity may update the bid through the server environment through I/O device 215 of computing device 130. The updated bid may be transmitted to the second entity and the second entity may accept or decline the updated bid. The second entity may accept or decline the bid through a link, a button, or any other interaction with the server environment that allows the second entity to indicate if the updated bid has been accepted. The first entity may continue to update a bid until a final bid is accepted by the second entity. The second entity may accept a bid through any interaction with the server environment that indicates that the bid has been accepted. The dynamic and real-time auction may continue until a final bid is accepted by the second entity.

In some embodiments, process 400 may include transmitting an accepted message to the first entity when the bid is accepted by the second entity. The message may be any message that may notify the first entity that the second entity has accepted the bid. The message may be sent to the first entity through an electronic communication protocol, a notification application, or a graphical user interface as disclosed herein. In some embodiments, process 400 may further include transmitting a second message to the second entity when the dynamic and real-time auction ends, wherein the second message summarizes the transaction between the first entity and the second entity. The second message may be sent through an electronic communication protocol, a notification, or a graphical user interface, etc., as disclosed herein. Summarizing the transaction may include providing information such as the final bid price, the make and the model of the vehicle in the dynamic and real-time auction, a link to financing of the vehicle, a link to shipping of the vehicle, a delivery date of the vehicle, or any other details of the transaction. The summary may confirm to the second entity the details of the transaction and provide further information about financing and delivery of the vehicle. The second message may be sent to the second entity after the dynamic and real-time auction ends. The dynamic and real-time auction may end when the second entity accepts a bid.

Figure 5:
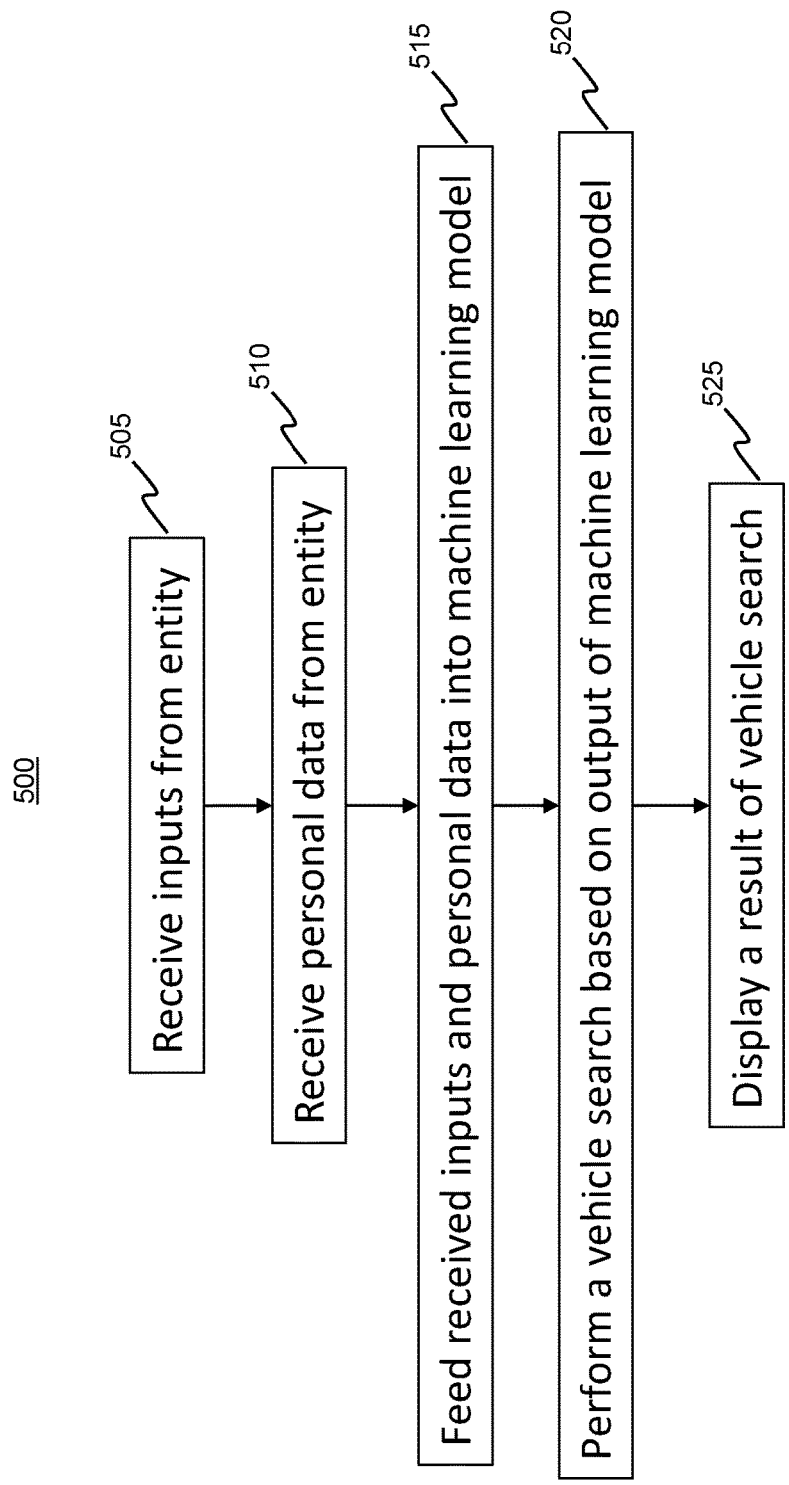
FIG. 5 is a flowchart showing an exemplary process for implementing machine learning techniques to develop display options, in accordance with disclosed embodiments.

FIG. 5 is a flowchart showing an exemplary process 500 for implementing machine learning techniques to develop display options. Process 500 may be performed by at least one processor, such as processor 205. In some embodiments, a non-transitory computer readable medium may contain instructions that when executed by a processor cause the processor to perform process 500. Further, process 500 is not necessarily limited to the steps shown in FIG. 5, and any steps or processes of the various embodiments described throughout the present disclosure may also be included in process 500.

At step 505, process 500 may include receiving inputs from an entity. The inputs may include, for example, at least one of a vehicle make, vehicle model, or vehicle color, etc. Vehicle make, vehicle model, and vehicle color may correspond to vehicle make, vehicle model, and vehicle color as described in step 405 with respect to FIG. 4. An entity may be any individual or entity that buys or sells vehicles. For example, an entity may correspond to the second entity as described with respect to FIG. 4. An input may comprise a text input, a check box, a button, a combination box, or any other form that allows the entity to input information. The inputted information may be sent to a server to be processed. In some embodiments, the received inputs may be default settings. A default setting may be a preconfigured value or setting that is not changed by the entity. For example, the entity may have previously searched a specific make and model of a vehicle and may set the previously searched make and model of the vehicle to be a default parameter. In such an example, the vehicle make and vehicle model may be default parameters. In some embodiments, the entity may deselect the default parameters. Deselecting the default parameters may include, for example, indicating that the default parameters are not to be used as received input. Deselecting the default parameters may allow the entity to input new parameters that may differ from the default parameters.

At step 510, process 500 may include receiving personal data from the entity. Personal data of the entity may comprise a name, contact information, address, vehicle financing information, or any other data that provides identifying information about the entity. In some embodiments, personal data may include a geographical location. Geographic location may comprise information about where the entity is located or where the entity is searching to purchase a vehicle from. Geographical location may be determined by setting a radius around a specific location. The specific location may be an address, a set of coordinates, a postal code, a city, or any other information that identifies a specific location of the entity. A radius may be a set distance around the specific location in which the entity may search for a vehicle. For example, the entity may set a radius, such as a 5-mile radius, a 10-mile radius, a 50-mile radius, or any other desired radius, around a specific location. In other embodiments, personal data may further comprise a credit score. A credit score may comprise a numerical value designed to represent a credit risk of the entity.

At step 515, process 500 may include feeding the received inputs and personal data into a machine learning model, wherein the machine learning model includes comparable inputs and personal data based on a plurality of historical dynamic and real-time auctions. A machine learning model may be a model that has been trained to recognize specific pattern types. Machine learning models may be trained using training examples to perform particular functions (including supervised and/or unsupervised). Some non-limiting examples of algorithms used as part of machine learning models may include classification algorithms, data regressions algorithms, image segmentation algorithms, visual detection algorithms (such as object detectors, face detectors, person detectors, motion detectors, edge detectors, etc.), visual recognition algorithms (such as face recognition, person recognition, object recognition, etc.), speech recognition algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. For example, a trained machine learning model may include an inference model, such as a predictive model, a classification model, a regression model, a clustering model, a segmentation model, an artificial neural network (such as a deep neural network, a convolutional neural network, a recursive neural network, etc.), a random forest, a support vector machine, and so forth. In some examples, the training examples may include example inputs together with the desired outputs corresponding to the example inputs. For example, the training examples may include as inputs prior received inputs and prior personal data from previous entities that have used the dynamic and real-time auction. Further, the desired outputs corresponding to the example inputs may be results of prior dynamic and real time auctions. The prior received inputs, received personal data, and results of prior dynamic and real time auctions may be used to train the machine learning model to infer outputs from new sets of received inputs and received personal data.

A trained machine learning model may be used to analyze inputs and generate outputs, for example in the cases described below. In some examples, a trained machine learning model may be used as an inference model that, when provided with an input, generates an inferred output. For example, a trained machine learning model may include a classification algorithm, the input may include a sample, and the inferred output may include a classification of the sample (such as an inferred label, an inferred tag, and so forth). In another example, a trained machine learning model may include a regression model, the input may include a sample, and the inferred output may include an inferred value for the sample. In yet another example, a trained machine learning model may include a clustering model, the input may include a sample, and the inferred output may include an assignment of the sample to at least one cluster. In an additional example, a trained machine learning model may include a classification algorithm, the input may include an image, and the inferred output may include a classification of an item depicted in the image. In yet another example, a trained machine learning model may include a regression model, the input may include an image, and the inferred output may include an inferred value for an item depicted in the image (such as an estimated property of the item, such as size, volume, cost of a product depicted in the image, and so forth). In an additional example, a trained machine learning model may include an image segmentation model, the input may include an image, and the inferred output may include a segmentation of the image. In yet another example, a trained machine learning model may include an object detector, the input may include an image, and the inferred output may include one or more detected objects in the image and/or one or more locations of objects within the image. In some examples, the trained machine learning model may include one or more formulas and/or one or more functions and/or one or more rules and/or one or more procedures, the input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

Feeding the received inputs and personal data into the machine learning model may comprise using the received inputs and personal data as inputs into the machine learning model. The machine learning model may then use the inputs to infer outputs. The machine learning model may infer outputs through the training from prior received inputs and prior personal data used as inputs from historical dynamic and real-time auctions, as disclosed herein.

In some embodiments, the machine learning model may be configured to fuzz the search parameters based on the plurality of historical and dynamic real-time auctions. The search parameters may be the output of the machine learning model that may be used to perform a vehicle search. Fuzzing the search parameters may comprise providing search parameters that do not exactly meet the received input from the entity. Fuzzing the search parameters may include providing a search parameter that deviates from the received input from the entity based on the historical dynamic and real-time auctions. For example, the machine learning model may output search parameters that include one or more different vehicle makes, vehicle models, or vehicle colors that differ from the received input. The one or more vehicle makes, vehicle models, or vehicle colors may be output from the machine learning model based on vehicle makes, vehicle models, or vehicle colors that were searched for and purchased in historical dynamic and real-time auctions. As a non-limiting example, the received input from an entity may include a white vehicle color and the machine learning model output may include fuzzed search parameters that may include white vehicles, gray vehicles, and beige vehicles based on historical dynamic and real-time auctions. In historical dynamic and real-time auctions, previous entities may have bought a white vehicle but also searched for a gray vehicle and a beige vehicle or previous entities may have bought a grey vehicle but also searched for a white vehicle. The search parameters and auction results of dynamic and real-time auctions may be used by the machine learning model to output fuzzed search parameters. The fuzzed search parameters may include vehicle price, vehicle type, vehicle model, vehicle condition, vehicle year, vehicle color, geographic location, etc., or any other parameter that may be used to search for a vehicle.

At step 520, process 500 may include performing a vehicle search based on an output of the machine learning model. An output of the machine learning model may comprise one or more vehicle search parameters that may be used in performing a vehicle search. The one or more vehicle search parameters may include vehicle price, vehicle type, vehicle model, vehicle condition, vehicle year, vehicle color, geographic location, etc., or any other parameter that may be used to search for a vehicle. The output of the machine learning model may further comprise fuzzed search parameters that do not exactly match the received input from the entity, as disclosed herein. A vehicle search may be a search of vehicles for sale that match the output of the machine learning model. Performing a vehicle search may comprise using the search parameters output from the machine learning model to match the search parameters with existing vehicles for sale. For example, performing a vehicle search may comprise identifying one or more vehicles for sale that have the same or similar characteristics as the search parameters output from the machine learning model.

In some embodiments, the vehicle search may include vehicles above a certain price range when the credit score received from the entity is above a predetermined limit. The price range of the vehicle may be the price at which the vehicle may be sold for. The price range may be set by the entity selling the vehicle. A predetermined limit may be a minimum credit score received as personal data from the entity. The predetermined limit may be set by the entity searching for the vehicle, the entity selling the vehicle, or the bank issuing a vehicle loan. The predetermined limit may be used to restrict the vehicle search results to vehicles that the entity may be qualified to purchase based on the credit score of the entity. If a received credit score is above the predetermined limit, the vehicle search may return vehicles that have a price range above a predetermined threshold. If the received credit score is below the predetermined limit, the vehicle search may return vehicles that have a price range below the predetermined threshold.

At step 525, process 500 may include displaying a result of the vehicle search to the entity. In some embodiments, a result of the vehicle search may comprise one or more vehicles that match the received inputs from the entity. In other embodiments, the result of the vehicle search may be a message indicating that no vehicles for sale match the received inputs from the entity. Displaying the result of the vehicle search to the entity may comprise a display screen with a report of the top three vehicle search results. A display screen may be a graphical user interface that visually outputs the results of the vehicle search for the entity to view. The display screen may include text, graphics, or videos that display the results of the vehicle search. A report of the top three vehicle search results may comprise a list of the vehicle search results with details about each vehicle. For example, the report may comprise a picture or video of the vehicle, vehicle price, vehicle type, vehicle model, vehicle condition, vehicle year, vehicle color, geographic location, or any other parameter that may identify characteristics of the vehicle search results.

In some embodiments, process 500 may include receiving an updated input from the entity, feeding the updated input into the machine learning model, performing an updated vehicle search based on an updated output of the machine learning model, and displaying an updated result of the vehicle search to the entity. Receiving an updated input from the entity may comprise receiving a new vehicle make, vehicle model, or vehicle color that differs from the original vehicle make, vehicle model, or vehicle color from the original received inputs. Receiving an updated input may expand or limit the vehicle search results from the original vehicle search results. Feeding the updated input into the machine learning model may correspond to step 515 for feeding the received inputs into the machine learning model, as described above. Performing an updated vehicle search based on an updated output of the machine learning model may correspond to step 520 for performing a vehicle search based on an output of the machine learning model as described above. Displaying an updated result of the vehicle search to the entity may correspond to step 525 for displaying a result of the vehicle search to the entity as described above.

In some embodiments, process 500 may include receiving updated personal data from the entity, feeding the updated personal data into the machine learning model, performing an updated vehicle search based on an updated output of the machine learning model, and displaying an updated result of the vehicle search to the entity. Receiving updated personal data may comprise receiving personal data from the entity that differs from the original personal data. For example, updated personal data may comprise a new credit score, an updated financing source, an updated down payment amount, an updated geographic location, or any other new data that provides identifying information about the entity. The updated personal data may expand or limit the vehicle search results from the original vehicle search results. Feeding the updated input into the machine learning model may correspond to step 515 for feeding the received inputs into the machine learning model, as described above. Performing an updated vehicle search based on an updated output of the machine learning model may correspond to step 520 for performing a vehicle search based on an output of the machine learning model as described above. Displaying an updated result of the vehicle search to the entity may correspond to step 525 for displaying a result of the vehicle search to the entity as described above.

Figure 6:
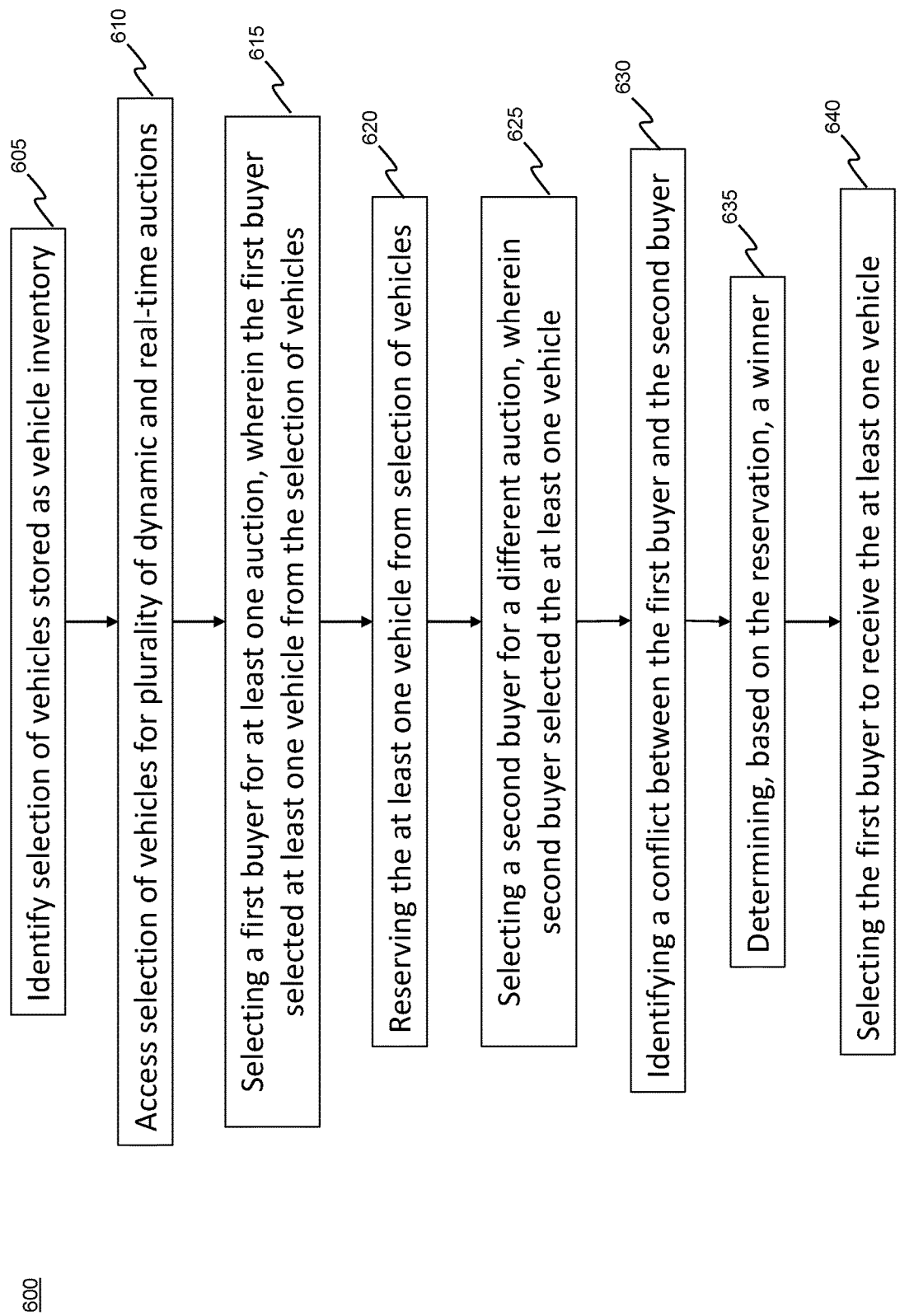
FIG. 6 is a flowchart showing an exemplary process for guarding inventory, in accordance with disclosed embodiments.

FIG. 6 is a flowchart showing an exemplary process 600 for guarding inventory and avoiding auction conflict. Process 600 may be performed by at least one processor, such as processor 205. In some embodiments, a non-transitory computer readable medium may contain instructions that when executed by a processor cause the processor to perform process 600. Further, process 600 is not necessarily limited to the steps shown in FIG. 6, and any steps or processes of the various embodiments described throughout the present disclosure may also be included in process 600.

At step 605, process 600 may include identifying a selection of vehicles stored as vehicle inventory. Vehicle inventory may be, for example, all vehicles that are for sale within the system, a subset of those vehicles, etc. Identifying a selection of vehicles may include obtaining first vehicle information from the first buyer to create the at least one auction and obtaining second vehicle information from the second buyer to create the at least one different auction, wherein the at least one auction and the at least one different auction both include the at least one vehicle. First vehicle information from the first buyer may comprise one or more of: vehicle make, vehicle model, vehicle options, vehicle color, vehicle condition, vehicle history, vehicle odometer reading, or vehicle geographic location, etc. Second vehicle information from the second buyer may also comprise one or more of: vehicle make, vehicle model, vehicle options, vehicle color, vehicle condition, vehicle history, vehicle odometer reading, or vehicle geographic location, etc. The first vehicle information and the second vehicle information may comprise the same parameters or different parameters. A selection of vehicles may be identified from vehicle inventory that match the first vehicle information and the second vehicle information. For example, identifying a selection of vehicles may comprise determining that a selection of a plurality of vehicles within vehicle inventory may meet the search parameters of the first buyer and the search parameters of the second buyer.

At step 610, process 600 may include accessing the selection of vehicles for a plurality of dynamic and real-time auctions. Accessing the selection of vehicles may comprise designating the selection of vehicles from vehicle inventory to be used in a plurality of dynamic and real-time auctions. One or more of the vehicles within the selection of vehicles may be selected for use in a plurality of dynamic and real-time auctions. Accessing the selection of vehicles may include allowing the first buyer and the second buyer to select one or more vehicles from the selection of vehicles for a plurality of dynamic and real-time auctions. The plurality of dynamic and real-time auctions may correspond to the dynamic and real-time auction as disclosed herein with respect to FIG. 4.

At step 615, process 600 may include selecting a first buyer of at least one auction of the plurality of dynamic and real-time auctions, wherein the first buyer selected at least one vehicle from the selection of vehicles. A first buyer may have selected at least one vehicle from the selection of vehicles to begin a dynamic and real-time auction. The first buyer may be connected in a server environment to participate in at least one dynamic and real-time auction for the at least one vehicle from the selection of vehicles. The first buyer may be selected because the first buyer may be participating in at least one dynamic and real-time auction for at least one vehicle from the selection of vehicles. Selecting the first buyer may include designating that the first buyer has selected at least one vehicle from the selection of vehicles for a dynamic and real-time auction.

At step 620, process 600 may include reserving the at least one vehicle from the selection of vehicles. In some embodiments, reserving the at least one vehicle from the selection of vehicles may comprise designating that the at least one vehicle is in a dynamic and real-time auction to prevent the at least one vehicle from being used in a second (e.g., potentially conflicting) dynamic and real-time auction. In other embodiments, reserving the at least one vehicle may comprise removing the at least one vehicle from the vehicle inventory. The at least one vehicle may be removed from the vehicle inventory to prevent another entity from beginning a second dynamic and real-time auction for the same vehicle. Removing the at least one vehicle from the vehicle inventory may include deleting a record of the at least one vehicle from the vehicle inventory, hiding the record of the at least one vehicle from the vehicle inventory, or indicating that the at least one vehicle may not be displayed as part of the vehicle inventory.

At step 625, process 600 may include selecting a second buyer of at least a different auction of the plurality of dynamic and real-time auctions. For example, the second buyer may have selected the at least one vehicle from the selection of vehicles. Selecting the second buyer may correspond to step 615 for selecting a first buyer, as disclosed above.

At step 630, process 600 may include identifying a conflict between the first buyer and the second buyer. A conflict between the first buyer and the second buyer may comprise identifying that the first buyer and the second buyer are participating in separate dynamic and real-time auctions for the same at least one vehicle from the selection of vehicles. Identifying the conflict between the first buyer and the second buyer may comprise comparing the vehicle in the at least one auction and the at least different auction. If it is determined that the vehicle in each of the at least one auction and the at least different auction are the same vehicle, a conflict may be identified. In some embodiments, the conflict may be identified before a termination of the auction involving the first buyer and the different auction involving the second buyer. In some embodiments, the conflict may be identified after a termination of one of the auctions involving the first buyer and the different auction involving the second buyer.

At step 635, process 600 may include determining, based on the reservation, a winner. The winner may be determined by identifying that the first buyer has a reservation for the at least one vehicle before the second buyer selected the at least one vehicle to begin a dynamic and real-time auction. The winner may be determined based on the timing of the reservation compared to the time that the second buyer selected the at least one vehicle. For example, if the reservation is made for the first buyer before the second buyer selected the at least one vehicle for the at least different auction, then the first buyer may be determined to be the winner.

At step 640, process 600 may include selecting the first buyer to receive the at least one vehicle from the selection of vehicles. Selecting the first buyer to receive the at least one vehicle may comprise indicating that the first buyer may receive the at least one vehicle. For example, selecting the first buyer may comprise sending a notification to the first buyer that the first buyer has received the at least one vehicle. Selecting the first buyer may also comprise sending a second notification to the second buyer that the second buyer has not received the at least one vehicle. Selecting the first buyer to receive the at least one vehicle may further comprise allowing the first buyer to continue the at least one dynamic and real-time auction to select a bid from a bidder for the at least one vehicle.

In some embodiments, a winner may be determined based on a first to close of the auction involving the first buyer and the different auction involving the second buyer. The first to close the auction may be determined based on a first of the first buyer and the second buyer to complete a transaction for the at least one vehicle. Completing a transaction may comprise accepting a bid for the at least one vehicle in the at least one auction or the at least different auction, submitting payment information, submitting shipping information, submitting credit score information, submitting loan information, or submitting any other information indicating that the transaction may be completed. By accepting a bid for the at least one vehicle, the dynamic and real-time auction of the first buyer or the second buyer may be completed and closed. The winner between the first buyer and the second buyer may be identified by determining which of the first buyer or the second buyer completed a transaction with a bidder for the at least one vehicle and closes the dynamic and real-time auction first. The winner between the first buyer and the second buyer may be permitted to continue with the purchase of the at least one vehicle, while the non-winner between the first buyer and the second buyer may be prevented from continuing the dynamic and real-time auction for the at least one vehicle.

In some embodiments, process 600 may include generating a non-winning notification, based on the determination of the winner, in a non-winning one of the auction involving the first buyer and the different auction involving the second buyer. The non-winning notification may be sent to a non-winning buyer of the first buyer and the second buyer. The non-winning buyer of the first buyer and the second buyer may be determined based on the reservation of the at least one vehicle or based on which of the first buyer or the second buyer closed the dynamic and real-time auction for the at least one vehicle first, as disclosed herein. The non-winning buyer may be the buyer that was not selected to receive the at least one vehicle. The non-winning notification may be a message that the auction of the non-winning buyer has been cancelled, that the at least one vehicle has been purchased by another buyer, or any message indicating that the non-winning buyer was not selected to receive the at least one vehicle. Sending a non-winning notification to a non-winning buyer may comprise automatically transmitting the non-winning notification via an electronic communications protocol. An electronic communications protocol may comprise a set of rules that allows two or more entities in a communications system to transmit information. For example, the electronic communications protocol may define rules, semantics, syntax, and synchronization to allow two or more entities to transmit information. In some embodiments, the electronic communications protocol may include a text message, an email, a push notification, an in-application notification, or any other notification that may transmit a non-winning notification to the non-winning buyer, etc. In some embodiments, the non-winning buyer may be returned to the different auction, wherein the different auction does not include the at least one vehicle. Returning the non-winning buyer to the different auction may comprise allowing the non-winning buyer to continue a dynamic and real-time auction for a different vehicle from the selection of vehicles.

In some embodiments, process 600 may include generating a winning notification, based on the determination of the winner, in a winning one of the auction involving the first buyer and the different auction involving the second buyer. The winning notification may be sent to a winning buyer of the first buyer and the second buyer. The winning buyer of the first buyer and the second buyer may be determined based on the reservation of the at least one vehicle or based on which of the first buyer or the second buyer closed the dynamic and real-time auction for the at least one vehicle first, as disclosed herein. The winning buyer may be the buyer that was selected to receive the at least one vehicle. The winning notification may be a message that the winning buyer may continue the dynamic and real-time auction for the at least one vehicle or any message indicating that the winning buyer was selected to receive the at least one vehicle. Sending a winning notification to a winning buyer may comprise automatically transmitting the winning notification via an electronic communications protocol. An electronic communications protocol may comprise a set of rules that allows two or more entities in a communications system to transmit information. For example, the electronic communications protocol may define rules, semantics, syntax, and synchronization to allow two or more entities to transmit information. In some embodiments, the electronic communications protocol may include a text message, an email, a push notification, an in-application notification, or any other notification that may transmit a winning notification to the winning buyer.

In some embodiments, the at least one vehicle may be sold by a dealer. In some embodiments, process 600 may include allowing the dealer to save a floor price, wherein the floor price is a minimum sale price of the at least one vehicle. A minimum sale price of the vehicle may be the lowest price that the dealer will sell the at least one vehicle for in a dynamic and real-time auction. In some embodiments, the floor price may be applied to every auction in the plurality of dynamic and real-time auctions. The dealer may be allowed to adjust the floor price. Adjusting the floor price may comprise raising or lowering the floor price. The floor price may be adjusted in one dynamic and real-time auction or may be adjusted and applied to every auction in the plurality of dynamic and real-time auctions. If bidding for the at least one vehicle goes below the floor price, then the dealer and the at least one vehicle may be removed from the dynamic and real-time auctions.

Figure 7:
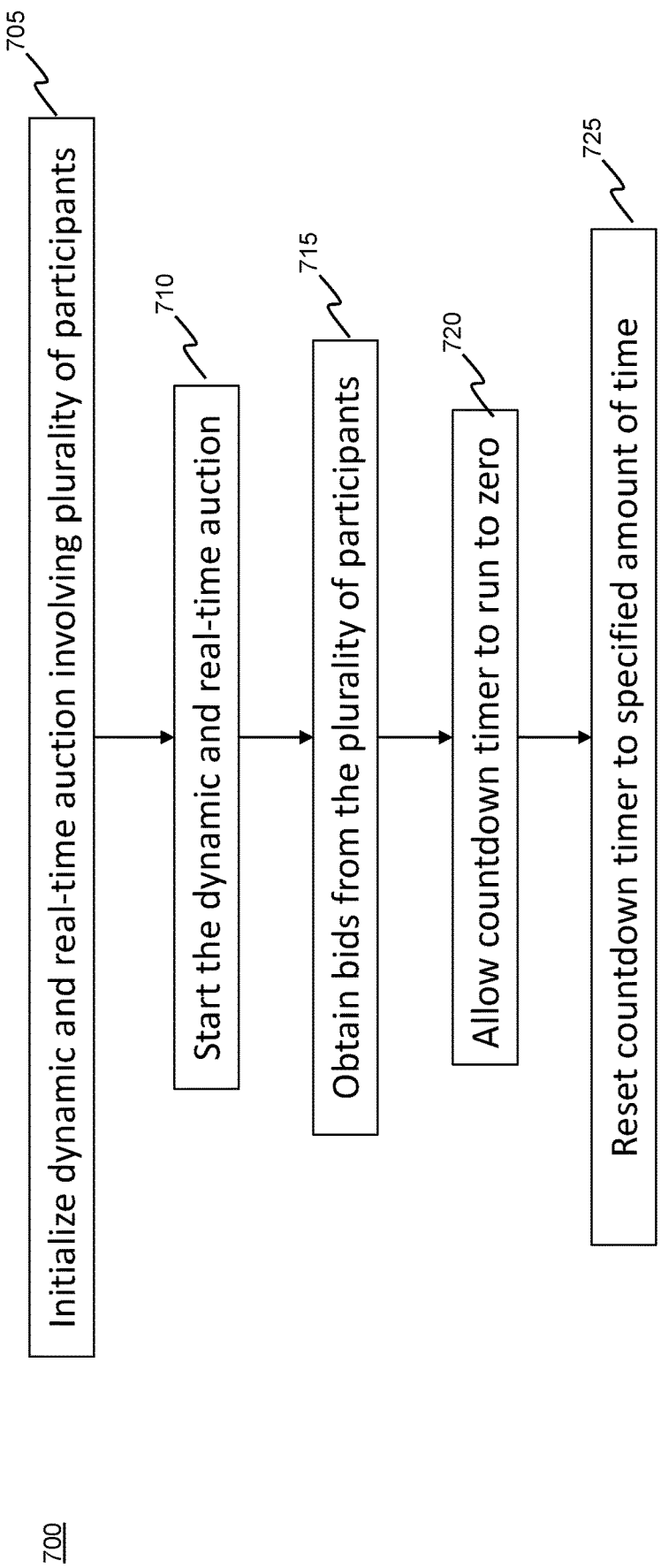
FIG. 7 is a flowchart showing an exemplary process for resetting a timer to efficiently implement a dynamic and real-time auction, in accordance with disclosed embodiments.

FIG. 7 is a flowchart showing an exemplary process 700 for resetting a timer to efficiently implement a dynamic and real-time auction. Process 700 may be performed by at least one processor, such as processor 205. In some embodiments, a non-transitory computer readable medium may contain instructions that when executed by a processor cause the processor to perform process 700. Further, process 700 is not necessarily limited to the steps shown in FIG. 7, and any steps or processes of the various embodiments described throughout the present disclosure may also be included in process 700.

At step 705, process 700 may include initializing a dynamic and real-time auction involving a plurality of participants, wherein the dynamic and real-time auction ends after a specified amount of time. The dynamic and real-time auction of process 700 may correspond to the dynamic and real-time auction as disclosed herein with respect to FIG. 4. The dynamic and real-time auction may end after a specified amount of time. The specified amount of time may be set by one of the plurality of participants of the dynamic and real-time auction, may be automatically set by the dynamic and real-time auction, or may be set using any other method for setting a timer. The specified amount of time may represent the time in which the plurality of participants may submit a bid before a dynamic and real-time auction closes. A plurality of participants may include at least one seller of a vehicle, at least one bidder for the vehicle, at least one buyer of a vehicle, or at least one dealer. For example, the plurality of participants may include at least one entity selling at least one vehicle and at least one entity bidding to buy the at least one vehicle in the dynamic and real-time auction. The plurality of participants may correspond to the first entity and the second entity as disclosed herein with respect to FIG. 4.

At step 710, process 700 may include starting the dynamic and real-time auction, wherein the dynamic and real-time auction includes a countdown timer set to the specified amount of time. Starting the dynamic and real-time auction may include connecting the plurality of participants to a dynamic and real-time auction in a server environment as disclosed herein with respect to FIG. 4. Starting the dynamic and real-time auction may further include allowing the plurality of entities to submit a bid for a vehicle. The dynamic and real-time auction may include a countdown timer set to the specified amount of time. The countdown timer may track the amount of time remaining in the dynamic and real-time auction by counting down from the specified amount of time to zero. The countdown timer may be visually displayed to the plurality of participants of the dynamic and real-time auction through a graphical user interface to notify the plurality of participants of the amount of time remaining in the dynamic and real-time auction. In some embodiments, the countdown timer may not be visually displayed to the plurality of participants and may only notify the plurality of participants when the countdown timer has reached zero.

At step 715, process 700 may include obtaining bids from the plurality of participants in the dynamic and real-time auction. Obtaining bids from the plurality of participants may include receiving, through an input from the plurality of participants, a purchase price that the plurality of participants may offer to a seller of a vehicle to purchase the vehicle. Obtaining bids may include receiving one bid from each of the plurality of participants or may include receiving a plurality of bids from each of the plurality of participants. The obtained bids may be transmitted to the seller of the vehicle through the dynamic and real-time auction.

At step 720, process 700 may include allowing the countdown timer to run to a zero time in the dynamic and real-time auction. The countdown timer may begin at the specified amount of time and may count down numerically from the specified amount of time to a zero time. Allowing the countdown timer to run to a zero time may comprise allowing the timer to countdown from the specified amount of time to a zero time. Allowing the countdown timer to run to a zero time may further comprise preventing the countdown timer from being paused or stopped during the countdown from the specified amount of time to the zero time.

At step 725, process 700 may include resetting the countdown timer to the specified amount of time in the dynamic and real-time auction, wherein the resetting occurs until no more bids are obtained and a seller selects a winning bid. Resetting the countdown timer may comprise automatically updating the timer from a zero time to the specified amount of time. For example, resetting the countdown may automatically update the timer to the specified amount of time so that the countdown timer may count down from the specified amount of time to a zero time. The countdown timer may be reset until no more bids are obtained and the seller selects a winning bidder. In some embodiments, the resetting of the countdown timer may occur while bids are still being obtained. For example, the countdown timer may reach a zero time while bidders are still inputting bids and the countdown timer may automatically reset to the specified amount of time while the bids are being obtained from bidders. Resetting the countdown timer may provide additional time to obtain bids from the plurality of participants in the dynamic and real-time auction. The countdown timer may be reset until no more bids are obtained and the seller has selected a winner.

In some embodiments, process 700 may further include stopping the resetting based on an input and while bids are still being obtained. The input may be set by the seller or may be set automatically in the dynamic and real-time auction. The input may include a determination that a threshold price is reached. A threshold price may be a minimum price that a seller is willing to sell a vehicle for in a dynamic and real-time auction. The threshold price may be set by a seller in a dynamic and real-time auction or may be set automatically. If it has been determined that the threshold price has been met by a bid obtained in the dynamic and real-time auction, then the resetting of the countdown timer may be stopped, even if other bids are still being obtained. In some embodiments, the input may be a determination that a threshold time is reached. A threshold time may be a total amount of time to conduct the dynamic and real-time auction. A threshold time may be set by a seller of a vehicle in a dynamic and real-time auction as the maximum amount of time for the dynamic and real-time auction. The resetting of the countdown timer may be stopped if it is determined that the threshold amount of time has been reached. Once the threshold amount of time has been reached, the countdown timer may not be reset to any additional time. In some embodiments, the input may be a determination that a threshold number of bids has been reached. A threshold number of bids may be a minimum number of bids that must be obtained in the dynamic and real-time auction. The threshold number of bids may be set by the seller or may be set automatically in the dynamic and real-time auction. Resetting the countdown timer may be stopped if it is determined that the threshold number of bids has been reached in the dynamic and real-time auction.

In some embodiments, stopping the resetting may be based on a request to end the dynamic and real-time auction received from the seller. The seller may send a request during the dynamic and real-time auction to end the dynamic and real-time auction before the auction has been completed. The seller may request to end the dynamic and real-time auction after selecting a winning bid, or the seller may end the dynamic and real-time auction without selecting a winning bid. Receiving a request from the seller to end the dynamic and real-time auction may stop the resetting of the countdown timer.

In some embodiments, process 700 may include selecting a winning bid from a plurality of bids obtained during the dynamic and real-time auction and prior to the stopping of the resetting. A winning bid of the dynamic and real-time auction may be selected by the seller of the vehicle. When a winner of the dynamic and real-time auction has been selected by the seller, the resetting of the countdown timer may be stopped. The countdown timer may not be reset to the specified amount of time because the winner of the dynamic and real-time auction has been selected which may cause the closing of the dynamic and real-time auction.

In some embodiments, process 700 may include obtaining a floor price from the seller. A floor price from the seller may be a minimum bid price accepted from the plurality of participants. For example, the floor price may be the minimum price that the seller may sell the vehicle for in the dynamic and real-time auction. The seller may set the floor price before beginning the dynamic and real-time auction. The countdown timer may continue to be reset until the floor price is reached. In some embodiments, the dynamic and real-time auction may automatically accept a first bid received from the plurality of participants that meets the floor price. The seller may override the acceptance of the first bid to reach the floor price to allow the dynamic and real-time auction to continue. In some embodiments, the seller may adjust the floor price during the dynamic and real-time auction. Adjusting the floor price may comprise raising or lowering the floor price during the dynamic and real-time auction. The floor price may be saved for use across a plurality of dynamic and real-time auctions. Saving the floor price may comprise recording the floor price to be applied in different dynamic and real-time auctions.

In some embodiments, process 700 may further include transmitting a message to a winning participant of the plurality of participants, wherein the winning participant is associated with the winning bid. The message sent to the winning participant may comprise a message notifying the winning participant that its bid has been accepted by the seller. A winning participant of the plurality of participant may be the participant whose bid is selected by the seller. Sending a message to a winning participant may comprise, for example, automatically transmitting the message via an electronic communications protocol. An electronic communications protocol may comprise a set of rules that allows two or more entities in a communications system to transmit information. For example, the electronic communications protocol may define rules, semantics, syntax, and synchronization to allow two or more entities to transmit information. In some embodiments, the electronic communications protocol may include a text message, an email, a push notification, an in-application notification, or any other notification that may transmit a message to the winning participant.

In some embodiments, process 700 may include transmitting a message to a non-winning participant of the plurality of participants, wherein the non-winning participant is not associated with the winning bid. The non-winning participant may be the participant whose bid was not selected by the seller in a dynamic and real-time auction. A non-winning message may comprise a notification that the bid of the non-winning participant has not been selected by the seller. Sending a non-winning message to a non-winning participant may comprise automatically transmitting the non-winning message via an electronic communications protocol. An electronic communications protocol may comprise a set of rules that allows two or more entities in a communications system to transmit information. For example, the electronic communications protocol may define rules, semantics, syntax, and synchronization to allow two or more entities to transmit information. In some embodiments, the electronic communications protocol may include a text message, an email, a push notification, an in-application notification, or any other notification that may transmit a non-winning message to the non-winning participant.

Figure 8:
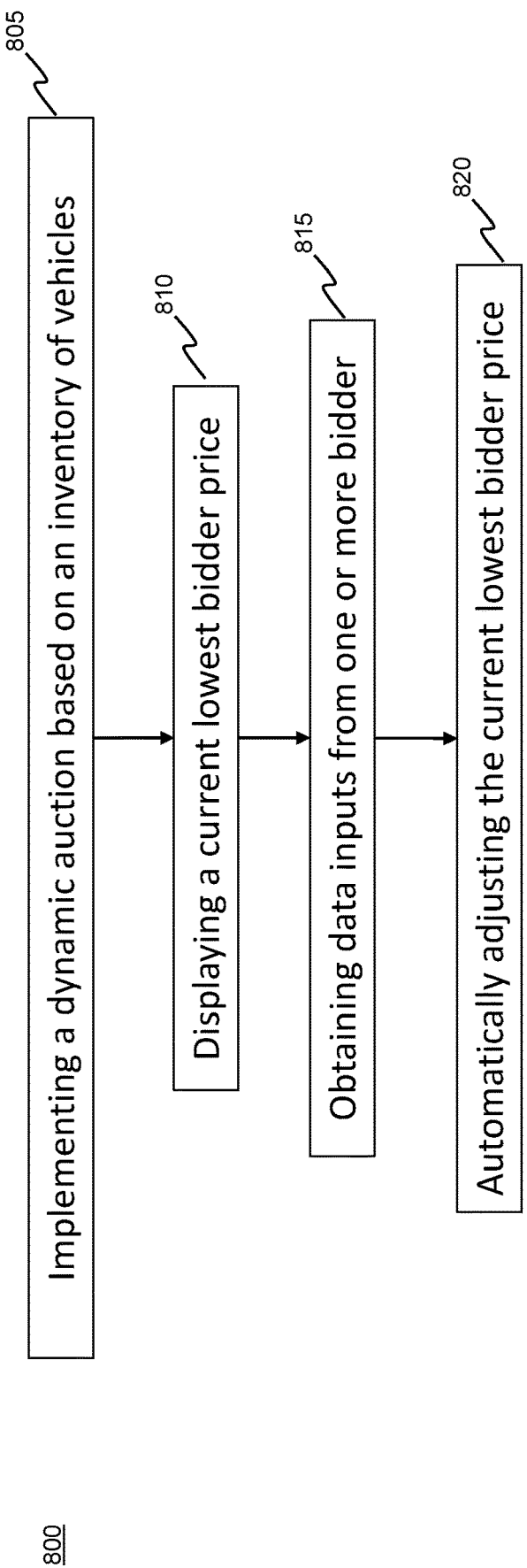
FIG. 8 is a flowchart showing an exemplary process for adjusting a visual real-time price for live bidding in a dynamic auction, in accordance with disclosed embodiments.

FIG. 8 is a flowchart showing an exemplary process 800 for adjusting a visual real-time price for live bidding in a dynamic auction. Process 800 may be performed by at least one processor, such as processor 205. In some embodiments, a non-transitory computer readable medium may contain instructions that when executed by a processor cause the processor to perform process 800. Further, process 800 is not necessarily limited to the steps shown in FIG. 8, and any steps or processes of the various embodiments described throughout the present disclosure may also be included in process 800.

At step 805, process 800 may include implementing a dynamic auction based on an inventory of vehicles. An auction may comprise a sales event wherein a plurality of entities may place competitive bids for the sale of a vehicle. The auction may be dynamic by allowing a plurality of bidders to update bids throughout the auction process and allowing the buyer to evaluate the bids throughout the auction process. Implementing a dynamic auction may include connecting the plurality of entities in a server environment to begin the dynamic and real-time auction. A server environment may be a networking environment that one or more customers may simultaneously access, either directly or remotely. A server may be a hardware server, or a server located in a hosted environment or a cloud environment. A server environment may run applications that may be accessed by clients in a client/server architecture. The dynamic auction may be implemented based on an inventory of vehicles. An inventory of vehicles may be a set of vehicles that may be bought or sold within the dynamic auction system. The inventory of vehicles may correspond to the complete list of vehicles that are in stock to be bought or sold in the dynamic auction system. For example, a dynamic auction may be implemented for vehicles that are in stock in the vehicle inventory of the dynamic auction system.

At step 810, process 800 may include displaying a current lowest bidder price on a graphical interface, wherein the current lowest bidder price relates to a lowest price metric among the inventory of vehicles. A graphical interface may be a form of user interface that allows a user, such as user 131, to interact with a computing device, such as computing device 130. The graphical interface may allow a user to interact with a computing device through the use of visual widgets, graphical icons, and the like. The graphical interface may visually display a current lowest bidder price which may visually indicate to a user the current lowest bidder price of the dynamic auction. A current lowest bidder price may be the lowest price offered by a bidder for the sale of a vehicle in a dynamic auction. The current lowest bidder price may relate to a lowest price metric among the inventory of vehicles. The lowest price metric may include a lowest price for a vehicle in a dynamic auction from among the inventory of vehicles.

In some embodiments, the display of a current lowest bidder price may further include a visual identification of a bidder corresponding to the current lowest bidder price. The visual identification of a bidder may be displayed on the graphical interface. In some embodiments, the visual identification may include geographical information for a bidder corresponding to the current lowest bidder price. The geographical information for a bidder corresponding to the current lowest bidder price may be information related to the location of the bidder in the dynamic auction that has offered the lowest price for the sale of a vehicle. The visual identification of the geographical information may include a map displaying a pinpoint location of the bidder, text information displaying the address of the bidder, a picture showing the location of the bidder, or any other visual representation of the geographical location of the bidder. In some embodiments, the visual identification may include an avatar for a bidder corresponding to the current lowest bidder price. An avatar for a bidder may be a visual representation of the bidder on a graphical interface that corresponds to a profile created by the bidder to provide additional bidder information. For example, a bidder may create a profile that includes pictures, information related to past sales, the current inventory of the bidder, reviews of the bidder, or any other information that a bidder may want to display to a potential buyer. A user may be able to select the avatar on the graphical interface to display the complete profile of the bidder. In some embodiments, the visual identification may include metric information for a bidder corresponding to the current lowest bidder price. Metric information for a bidder may include the number of vehicles that the bidder has sold, the average sales price of vehicles that the bidder has sold, reviews of the bidder, or any other information providing metrics on prior sales of the bidder.

In some embodiments, the display of the current lowest bidder price may include a monthly payment based on the current lowest bidder price. A monthly payment may be calculated based on a down payment amount input by the buyer, an interest rate of a loan, the length of a term of a loan, and the current lowest bidder price. The monthly payment may correspond to an amount of money the user may have to pay each month for the purchase of the vehicle. The monthly payment may be automatically adjusted based on the adjusted current lowest bidder price. For example, as the current lowest bidder price is adjusted, the calculation of the monthly payment may use the adjusted current lowest bidder price to determine the monthly payment. The graphical interface may display both the current lowest bidder price and the monthly payment associated with the current lowest bidder price.

In some embodiments, the display of the current lowest bidder price may include a total number of bidders live bidding in the dynamic auction. The total number of bidders live bidding may be the number of bidders that are actively placing and updating bids in the dynamic auction. This number may exclude bidders that are in the dynamic auction but are not placing bids. The number of live bidders in the dynamic auction may be automatically updated throughout the dynamic auction as bidders enter and exit the dynamic auction.

In some embodiments, the graphical interface may include a cost savings metric, wherein the cost savings metric is calculated based on a starting bid and the current lowest bidder price. A cost savings metric may visually demonstrate to a buyer how the price of the vehicle has changed over the course of the dynamic auction. The cost savings metric may be calculated by subtracting the current lowest bidder price from the starting bid price. The cost savings metric may show the buyer of the vehicle in the dynamic auction the amount of money that may be saved by buying the vehicle at the current lowest bidder price in the dynamic auction. The cost savings metric may be automatically adjusted based on the adjusted current lowest bidder price. As the current lowest bidder price is adjusted throughout the dynamic auction, the cost savings metric may automatically be adjusted and displayed to the buyer in the graphical interface.

At step 815, process 800 may include obtaining data inputs from one or more bidders in the dynamic auction while the dynamic auction is being implemented. Data inputs from one or more bidders may include at least one of location, type of vehicle, make of vehicle, or number of days on market. Location may include the geographic location of the vehicle. Type of vehicle may include the model of vehicle and other information about the vehicle such as model year, body style, vehicle color, trim level, and any other information providing details about the vehicle. Make of the vehicle may be the brand of the vehicle. Number of days on the market may include the number of days that the bidder has offered the vehicle for sale. The data inputs may be obtained from one or more bidders while the dynamic auction is being implemented. Bidders may enter the data inputs throughout the course of the dynamic auction to provide additional details to the buyer about the vehicle for sale.

At step 820, process 800 may include automatically adjusting, in real-time during the implementing of the dynamic auction, the current lowest bidder price on the graphical interface based on the obtained data inputs. The current lowest bidder price may be adjusting on the graphical interface by automatically displaying updated current lowest bidder price information on the graphical interface as new bid prices are obtained in the dynamic auction. The current lowest bidder price may be adjusted in real-time throughout the dynamic auction as adjusted information is received from one or more bidder. The adjusted current lowest bidder price may be displayed on the graphical interface to visually indicate to a buyer the real-time current lowest bidder price as the dynamic auction is implemented. The current lowest bidder price may be based on obtained data inputs from the one or more bidders. In some embodiments, the current lowest bidder price may be continually refreshed on the graphical interface during the dynamic auction as the data inputs are obtained. Continually refreshing the current lowest bidder price may comprise adjusting the current lowest bidder price on the graphical interface immediately, in real-time as data inputs are obtained in the dynamic auction. In other embodiments, the current lowest bidder price may be periodically refreshed on the graphical interface during the dynamic auction as the data inputs are obtained. Periodically refreshing the current lowest bidder price may comprise adjusting the current lowest bidder price displayed on the graphical interface after a certain period of time has passed. For example, the current lowest bidder price may be periodically refreshed once every 30 second, once every minute, or once during any other period of time.

In some embodiments, process 800 may include receiving vehicle inputs from a buyer, wherein the vehicle inputs relate to a vehicle type, retrieving vehicles from the inventory of vehicles that match the vehicle inputs, and creating the dynamic auction from the retrieved vehicles. Vehicle input may relate to a type of vehicle, or a vehicle make. Vehicle inputs related to a type of vehicle may include a model of vehicle and other information about the vehicle such as model year, body style, vehicle color, trim level, and any other information providing details about a vehicle. Vehicles that match the vehicle inputs may be retrieved from the vehicle inventory. Retrieving vehicles that match the vehicle inputs may comprise searching a database containing the vehicle inventory. The database of vehicle inventory may contain information related to all the vehicles in the vehicle inventory that are being offered for sale. Retrieving vehicles from vehicle inventory may comprise comparing vehicles in the vehicle inventory to the vehicle inputs to determine a selection of vehicles in the vehicle inventory with matching parameters. Vehicles in the vehicle inventory that match the vehicle inputs may be retrieved from the vehicle inventory. A dynamic auction may then be created for the retrieved vehicles. Creating a dynamic auction may correspond to step 805 for implementing a dynamic auction, as disclosed above.

In some embodiments, process 800 may include receiving updated vehicle inputs from a buyer, retrieving an updated list of vehicles from the inventory of vehicles that match the updated vehicle inputs, and updating the dynamic auction with the updated list of vehicles. Updated vehicle inputs may be received from a buyer during a dynamic auction to provide additional or different vehicles in the dynamic auction. Updated vehicle inputs may be additional or different vehicle inputs from the vehicle inputs that were originally obtained. For example, updated vehicle inputs may comprise new or different information related to vehicle make. An updated list of vehicles may be obtained from the inventory of vehicles that match the updated vehicle inputs. Retrieving vehicles that match the updated vehicle inputs may comprise searching the database of vehicle inventory that may contain information related to all the vehicles in the vehicle inventory that are being offered for sale. Vehicles that match the vehicle inputs may be retrieved from the vehicle inventory. The dynamic auction may be updated with the updated list of vehicles. Updating the dynamic auction may comprise including the updated list of vehicles in the dynamic auction. Updating the dynamic auction may allow new bidders associated with the updated list of vehicles to offer bids based on the updated list of vehicles that meet the updated vehicle inputs in the dynamic auction.

In some embodiments, process 800 may include accepting the current lowest bidder price, wherein the current lowest bidder price is associated with a vehicle from the inventory of vehicles. The current lowest bidder price may be accepted automatically at the end of a time period, after receiving a certain number of bids, after live bidding for the vehicle has ended, or at any other time of the dynamic auction. The current lowest bidder price may also be manually selected by a buyer during the dynamic auction. The current lowest bidder price may be associated with a vehicle from the inventory of vehicles. For example, the current lowest bidder price may correspond to a vehicle that was retrieved from the vehicle inventory that matched the vehicle inputs of the buyer.

In some embodiments, process 800 may include allowing a bidder to set a floor price, wherein the bidder is automatically removed from the dynamic auction when the current lowest bidder price goes below the floor price. A floor price may be a minimum sale price for a vehicle set by a bidder associated with the vehicle. A floor price may be set by the bidder before the beginning of a dynamic auction. The floor price may be saved across multiple dynamic auctions such that the same floor price is applied for a vehicle in multiple dynamic auctions. The bidder may be automatically removed from the dynamic auction when the current lowest bidder price is below the floor price.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, cloud platform resources, cloud-based assets, protocols, communication networks, security tokens and authentication credentials, and code types will be developed, and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination or as suitable in any other described embodiment of the invention. Certain features described in the context of various embodiments are not to be considered essential features of those embodiments unless the embodiment is inoperative without those elements.

Although the invention has been described in conjunction with specific embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A real-time distributed microservice application system for supporting an auction system, the real-time distributed microservice application system comprising:
   a memory storing instructions; and
   a stored vehicle inventory accessible by the auction system; and
   a processor configured to execute the instructions to perform operations of:
      obtaining dealer vehicle information from a first entity;
      obtaining buyer vehicle information from a second entity;
      obtaining second buyer vehicle information from a third entity,
      identifying a selection of vehicles from the stored vehicle inventory, based on the buyer vehicle information and the second buyer vehicle information;
      displaying the selection of vehicles to the first entity, wherein the first entity has a capability to apply at least one data input to each vehicle within the selection of vehicles;
      automatically creating a first dynamic and real-time auction for the second entity based on the selection of vehicles;
      automatically creating a second dynamic and real-time auction for the third entity based on the selection of vehicles, wherein the selection of vehicles is simultaneously accessible by the first dynamic and real-time auction and the second dynamic and real-time auction;
      transmitting a message to the second entity to join the first dynamic and real-time auction;
      transmitting a message to the first entity to join the first dynamic and real-time auction;
      transmitting a message to the third entity to join the second dynamic and real-time auction;
      connecting the first and second entity in a server environment to implement the first dynamic and real-time auction;
      connecting the third entity in a second server environment to implement the second dynamic and real-time auction, wherein the first dynamic and real-time auction runs simultaneously with the second dynamic and real-time auction;
      obtaining a bid from the first entity on at least a first vehicle in the selection of vehicles in the first dynamic and real-time auction, wherein the first entity has a capability to adjust the bid based on the data input;
      causing a display of a graphical interface representing the first dynamic and real-time auction with a first real-time and dynamically changing visual element, wherein the first real-time and dynamically changing visual element is associated with a current bid;
      causing an automatic adjustment, in the graphical interface, of the first real-time and dynamically changing visual element based on the current bid;
      allowing the second entity to accept or decline the current bid, wherein the first dynamic and real-time auction continues until a final bid is accepted by the second entity; and
      upon receiving acceptance of the final bid by the second entity, receiving a selection from the first entity to select the first vehicle to buy from the selection of vehicles, wherein the first vehicle is automatically removed from the second dynamic and real-time auction.

2. The real-time distributed microservice application system of claim 1, wherein the dealer vehicle information includes at least one of: vehicle make, vehicle model, vehicle options, vehicle color, vehicle condition, vehicle history, vehicle odometer reading, or vehicle geographic location.

3. The real-time distributed microservice application system of claim 1, wherein the buyer vehicle information includes at least one of: vehicle make, vehicle model, vehicle options, vehicle color, vehicle condition, vehicle history, vehicle odometer reading, or vehicle geographic location.

4. The real-time distributed microservice application system of claim 1, wherein the message transmitted to the first entity is automatically transmitted via an electronic communications protocol.

5. The real-time distributed microservice application system of claim 4, wherein the electronic communications protocol includes a notification application.

6. The real-time distributed microservice application system of claim 4, wherein the message transmitted to the first entity is transmitted via the graphical interface.

7. The real-time distributed microservice application system of claim 1, wherein the message transmitted to the second entity is automatically transmitted via an electronic communications protocol.

8. The real-time distributed microservice application system of claim 7, wherein the electronic communications protocol includes a notification application.

9. The real-time distributed microservice application system of claim 7, wherein the message transmitted to the second entity is transmitted via the graphical interface.

10. The real-time distributed microservice application system of claim 1, wherein the server environment is instantiated on a just-in-time basis for the first dynamic and real-time auction.

11. The real-time distributed microservice application system of claim 1, wherein connecting the first and second entity in a server environment includes permitting access to the first and second entity into the server environment.

12. The real-time distributed microservice application of claim 11, further comprising allowing the first entity to update the bid once access is permitted to the first entity.

13. The real-time distributed microservice application system of claim 1, wherein the first real-time and dynamically changing visual element represents a current lowest bidder price.

14. The real-time distributed microservice application system of claim 1, wherein the data input includes at least one of: location, type of vehicle, make of vehicle, or number of days on market.

15. A method for operating a real-time distributed microservice application system for supporting an auction system, the method comprising:
   obtaining dealer vehicle information from a first entity;
   obtaining buyer vehicle information from a second entity;

obtaining second buyer vehicle information from a third entity, identifying a selection of vehicles from a stored vehicle inventory accessible by the auction system based on the buyer vehicle information and the second buyer vehicle information;

displaying the selection of vehicles to the first entity, wherein the first entity has a capability to apply at least one data input to each vehicle within the selection of vehicles;

automatically creating a first dynamic and real-time auction for the second entity based on the selection of vehicles;

automatically creating a second dynamic and real-time auction for the third entity based on the selection of vehicles, wherein the selection of vehicles is simultaneously accessible by the first dynamic and real-time auction and the second dynamic and real-time auction;

transmitting a message to the second entity to join the first dynamic and real-time auction;

transmitting a message to the first entity to join the first dynamic and real-time auction;

transmitting a message to the third entity to join the second dynamic and real-time auction;

connecting the first and second entity in a server environment to implement the first dynamic and real-time auction;

connecting the third entity in a second server environment to implement the second dynamic and real-time auction, wherein the first dynamic and real-time auction runs simultaneously with the second dynamic and real-time auction;

obtaining a bid from the first entity on at least a first vehicle in the selection of vehicles in the first dynamic and real-time auction, wherein the first entity has a capability to adjust the bid based on the data input;

causing a display of a graphical interface representing the first dynamic and real-time auction with a first real-time and dynamically changing visual element, wherein the first real-time and dynamically changing visual element is associated with a current bid;

causing an automatic adjustment, in the graphical interface, of the first real-time and dynamically changing visual element based on the current bid;

allowing the second entity to accept or decline the current bid, wherein the first dynamic and real-time auction continues until a final bid is accepted by the second entity; and upon receiving acceptance of the final bid by the second entity, receiving a selection from the first entity to select the first vehicle to buy from the selection of vehicles, wherein the first vehicle is automatically removed from the second dynamic and real-time auction.

16. The method of claim 15, wherein creating the first dynamic and real-time auction includes:
comparing the dealer vehicle information with the buyer vehicle information; and
forming the first dynamic and real-time auction based on matches between the dealer vehicle information and the buyer vehicle information.

17. The method of claim 16, wherein the second entity sets a parameter for comparing the dealer vehicle information with the buyer vehicle information.

18. The method of claim 17, wherein the parameter includes at least one of: vehicle make, vehicle model, vehicle options, vehicle color, vehicle condition, vehicle history, vehicle odometer reading, or vehicle geographic location.

19. The method of claim 18, wherein the second entity changes the parameter and the first dynamic and real-time auction is updated based on the changed parameter.

20. The method of claim 15, further comprising:
transmitting an accepted message to the first entity when the final bid is accepted by the second entity.

21. The method of claim 15, further comprising:
transmitting a second message to the second entity, wherein the second message summarizes a transaction between the first and second entity; and
transmitting the second message to the second entity when the first dynamic and real-time auction ends.

* * * * *